(12) United States Patent
Nojima

(10) Patent No.: US 11,449,292 B2
(45) Date of Patent: Sep. 20, 2022

(54) IMAGE PROCESSING DEVICE, JOB MANAGEMENT METHOD, AND NON-TRANSITORY RECORDING MEDIUM STORING COMPUTER READABLE PROGRAM

(71) Applicant: KONICA MINOLTA, INC., Tokyo (JP)

(72) Inventor: Nobuhiro Nojima, Tachikawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/308,240

(22) Filed: May 5, 2021

(65) Prior Publication Data

US 2021/0389918 A1    Dec. 16, 2021

(30) Foreign Application Priority Data

Jun. 11, 2020   (JP) .............................. JP2020-101345

(51) Int. Cl.
*G06F 3/12* (2006.01)
*H04N 1/00* (2006.01)

(52) U.S. Cl.
CPC .......... *G06F 3/1267* (2013.01); *G06F 3/1204* (2013.01); *G06F 3/1264* (2013.01); *H04N 1/00631* (2013.01); *H04N 1/00676* (2013.01)

(58) Field of Classification Search
None
See application file for complete search history.

(56) References Cited

U.S. PATENT DOCUMENTS

| | | | |
|---|---|---|---|
| 2006/0263112 A1* | 11/2006 | Umetani | G03G 15/50 399/130 |
| 2007/0013959 A1* | 1/2007 | Miwa | G06K 15/1848 358/1.12 |
| 2009/0303509 A1* | 12/2009 | Ozaki | H04N 1/00649 358/1.9 |

FOREIGN PATENT DOCUMENTS

| | | |
|---|---|---|
| JP | H10222322 A | 8/1998 |
| JP | 2009301112 A | 12/2009 |

* cited by examiner

*Primary Examiner* — Frantz Bataille
(74) *Attorney, Agent, or Firm* — Holtz, Holtz & Volek PC

(57) ABSTRACT

An image processing device reduces influence from delay due to one or more post processors and efficiently utilizes resources of an image former, to improve productivity. The image processing device includes: a job taker configured to take a print job; and a print data producer configured to output print data to an image former, configured to form an image on a sheet, and control a cutter configured to cut, inline, the sheet having the image formed and the image former. When the job taker takes a first print job to use the cutter and then takes a second print job not to use the cutter, the print data producer executes the first print job concurrently with the second print job.

17 Claims, 24 Drawing Sheets

IMAGE PROCESSING DEVICE, JOB MANAGEMENT METHOD, AND NON-TRANSITORY RECORDING MEDIUM STORING COMPUTER READABLE PROGRAM

CROSS-REFERENCE TO RELATED APPLICATION

This application claims the benefit of priority to Japanese Patent Application No. 2020-101345 filed on 11 Jun. 2020, the disclosures of all of which are hereby incorporated by reference in their entireties.

Technological Field

The present invention relates to an image processing device, a job management method, and a non-transitory recording medium storing computer readable program to process multiple jobs concurrently, in consideration of the time for post-print processing, a copy receiving tray, and a speed of forming image by a print engine.

BACKGROUND

A printer is required to do print processing at high speed in order to improve productivity per unit time. In addition to that, there is another requirement that post-processing such as cutting and stapling is preferably executed at the same time as printing, in order to flexibly react to diversified output, and some devices to do inline post-processing are marketed to realize such requirements.

However, a speed of post-processing such as cutting is generally slower than a printing speed. Accordingly, there has been a problem that a print engine (image former) fails to deliver natural printing performance when coordinating operation with post-processing such as cutting.

DESCRIPTION OF RELATED ART

Japanese Patent Application Publication No. H10-222322 A (hereinafter referred to as Patent Document 1) discloses an invention to allow a single printer to print multiple pieces of print data inputted from multiple computers concurrently at the same time. However, the invention of Patent Document 1 does not take the time of forming an image and the time of post-print processing into consideration, nor improve productivity as a whole job.

Japanese Patent Application Publication No. 2009-301112 A (hereinafter referred to as Patent Document 2) discloses an invention to reduce a time to complete a single print job in which multiple contents are included, post processing is executed for one or more components outputted based on the contents, and all the components are finally collected. The invention of Patent Document 2 determines an order of printing so that one or more contents having component-level post processing specified are printed earlier than those not having such processing specified. However, the invention of Patent Document 2 does not take the time of forming an image and the time of post-print processing into consideration, nor improve productivity as a whole job so much.

SUMMARY

The present invention is then intended to reduce influence from delay due to one or more post processors and efficiently utilize resources of the image former, in regard to an image processing device, image forming device, a job management method, and a non-transitory computer-readable medium used for job management, to improve productivity.

More specifically, the above-identified problems are solved by following aspects of the present invention.

<First Aspect>

An image processing device includes: a job taker configured to take a print job; and a print data producer configured to output print data to an image former, configured to form an image on a sheet, and control a cutter configured to cut, inline, the sheet having the image formed and the image former, wherein when the job taker takes a first print job to use the cutter and then takes a second print job not to use the cutter, the print data producer executes the first print job concurrently with the second print job.

<Second Aspect>

In the image processing device as described in First Aspect, the print data producer controls the image former to form one or more images on one or more sheets for the second print job not to use the cutter, while the cutter is cutting one or more sheets for the first print job.

<Third Aspect>

In the image processing device as described in First or Second Aspect, when the job taker has taken the second print job not to use the cutter during execution of the first print job to use the cutter, the print data producer controls the image former to alternately form one or more images for a part of the first print job and one or more images for a part of the second print job.

<Fourth Aspect>

In the image processing device as described in any one of First to Third Aspects, when the job taker has taken the first print job during execution of the second print job, the print data producer executes the second print job and then the first print job.

<Fifth Aspect>

In the image processing device as described in any one of First to Fourth Aspects, when the first print job to use the cutter has been executed concurrently with the second print job not to use the cutter, resulted in completion of the second print job, and the job taker has taken a third print job not to use the cutter, the print data producer executes the first print job concurrently with the third print job.

<Sixth Aspect>

In the image processing device as described in any one of First to Fifth Aspects, when the first print job to use the cutter has been executed concurrently with the second print job not to use the cutter, resulted in completion of the first print job, and the job taker has taken a fourth print job to use the cutter, the print data producer executes the second print job and then the fourth print job.

<Seventh Aspect>

In the image processing device as described in any one of First to Sixth Aspects, the print data producer controls an ejector, configured to eject one or more sheets to one of trays, to eject one or more sheets having one or more images formed for the first print job to one tray and one or more sheets having one or more images formed for the second print jobs to another tray.

<Eighth Aspect>

In the image processing device as described in any one of First to Seventh Aspects, when the cutter has had a failure while the first print job to use the cutter has been executed concurrently with the second print job not to use the cutter, the print data producer interrupts the first print job and continuously executes the second print job.

<Ninth Aspect>

In the image processing device as described in any one of First to Eighth Aspects, when the job taker has taken the second print job not to use the cutter during execution of the first print job to use the cutter, the print data producer executes the first print job concurrently with the second print job, on the condition that the first print job is set to allow concurrent execution, while the print data producer executes the first print job and then executes the second print job, on the condition that the first print job is not set to allow concurrent execution.

<Tenth Aspect>

In the image processing device as described in any one of First to Ninth Aspects, when the job taker has taken the first print job to use the cutter during execution of the second print job not to use the cutter, the print data producer executes the first print job concurrently with the second print job, on the condition that the second print job is set to allow concurrent execution, while the print data producer executes the second print job and then executes the first print job, on the condition that the second print job is not set to allow concurrent execution.

<Eleventh Aspect>

In the image processing device as described in any one of First to Tenth Aspects, when the job taker has taken a fourth print job to use the cutter during execution of the first print job to use the cutter, the print data producer controls the first print job to use one cutter and the fourth print job to use another cutter.

<Twelfth Aspect>

The image processing device as described in any one of First to Eleventh Aspects further includes a checking unit, configured to check with a user whether or not two or more print jobs are concurrently executed, when the job taker has taken the second print job not to use the cutter during the print data producer executing the first print job to use the cutter.

<Thirteenth Aspect>

The image processing device as described in any one of First to Eleventh Aspects further includes a checking unit, configured to check with a user whether or not two or more print jobs are concurrently executed, when the job taker has taken the first print job to use the cutter during the print data producer executing the second print job not to use the cutter.

<Fourteenth Aspect>

The image processing device as described in any one of First to Seventh Aspects further includes an alarming unit, configured to alarm a user when the print data producer executes the first print job to use the cutter concurrently with the second print job not to use the cutter.

<Fifteenth Aspect>

An image forming device includes: the image processing device as described in any one of First to Fourteenth Aspects; an image former configured to form an image on a sheet; and a cutter to cut, inline, the sheet having the image formed thereon.

<Sixteenth Aspect>

A job management method includes: a step in which a job taker takes a first print job to use a cutter, configured to cut a sheet inline, and then takes a second print job not to use the cutter; and a step in which a print data producer controls an image former to form one or more images for a part of the first print job and concurrently form one or more images for a part of the second print job.

<Eighteenth Aspect>

A non-transitory computer-readable medium used for job management, when executed by a computer, instructs the computer to take a first print job to use a cutter, configured to cut a sheet inline, and then a second print job not to use the cutter, and instructs an image former to form one or more images for a part of the first print job to use the cutter and concurrently form one or more images for a part of the second print job not to use the cutter.

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
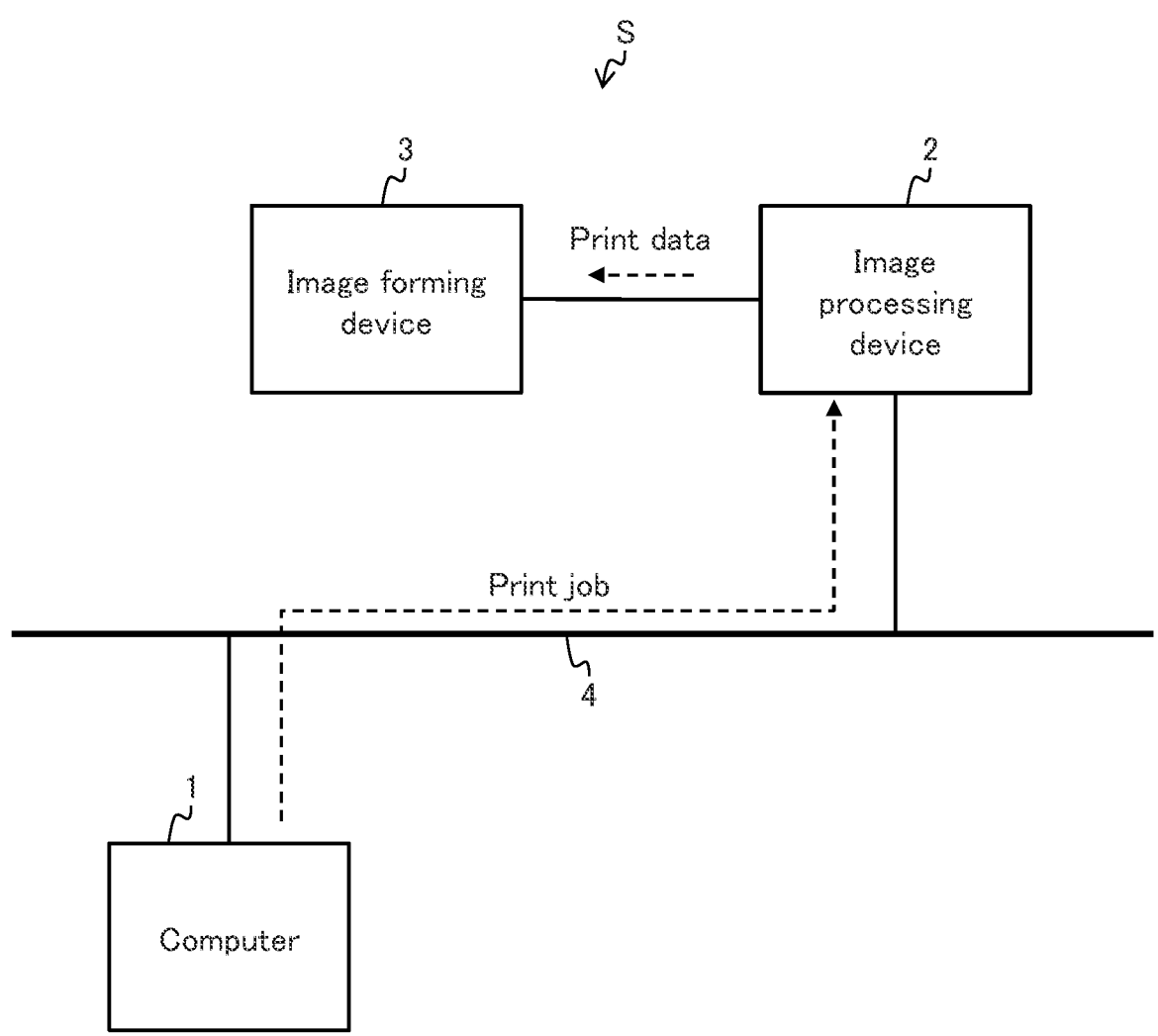
FIG. 1 shows a configuration of a system according to a present embodiment.

Hereinafter, an embodiment of the present invention is described in detail with reference to the drawings. However, the scope of the invention is not limited to the disclosed embodiment. FIG. 1 shows a configuration of a system according to the present embodiment. An image forming system S includes a computer 1, an image processing device 2, an image forming device 3, and a LAN (Local Area Network) 4.

The computer 1 is connected with the image processing device 2 via the LAN 4. The computer 1 sends a print job to the image processing device 2 via the LAN 4. The image processing device 2 forms print data from the print job, and sends the print data to the image forming device 3 via a dedicated line. The image forming device 3 forms one or more images on a record medium based on the print data, and executes post-processing on the record medium. Note that the present invention is not limited to this configuration and functions of the image processing device 2 may be included in an image forming device.

Figure 2:
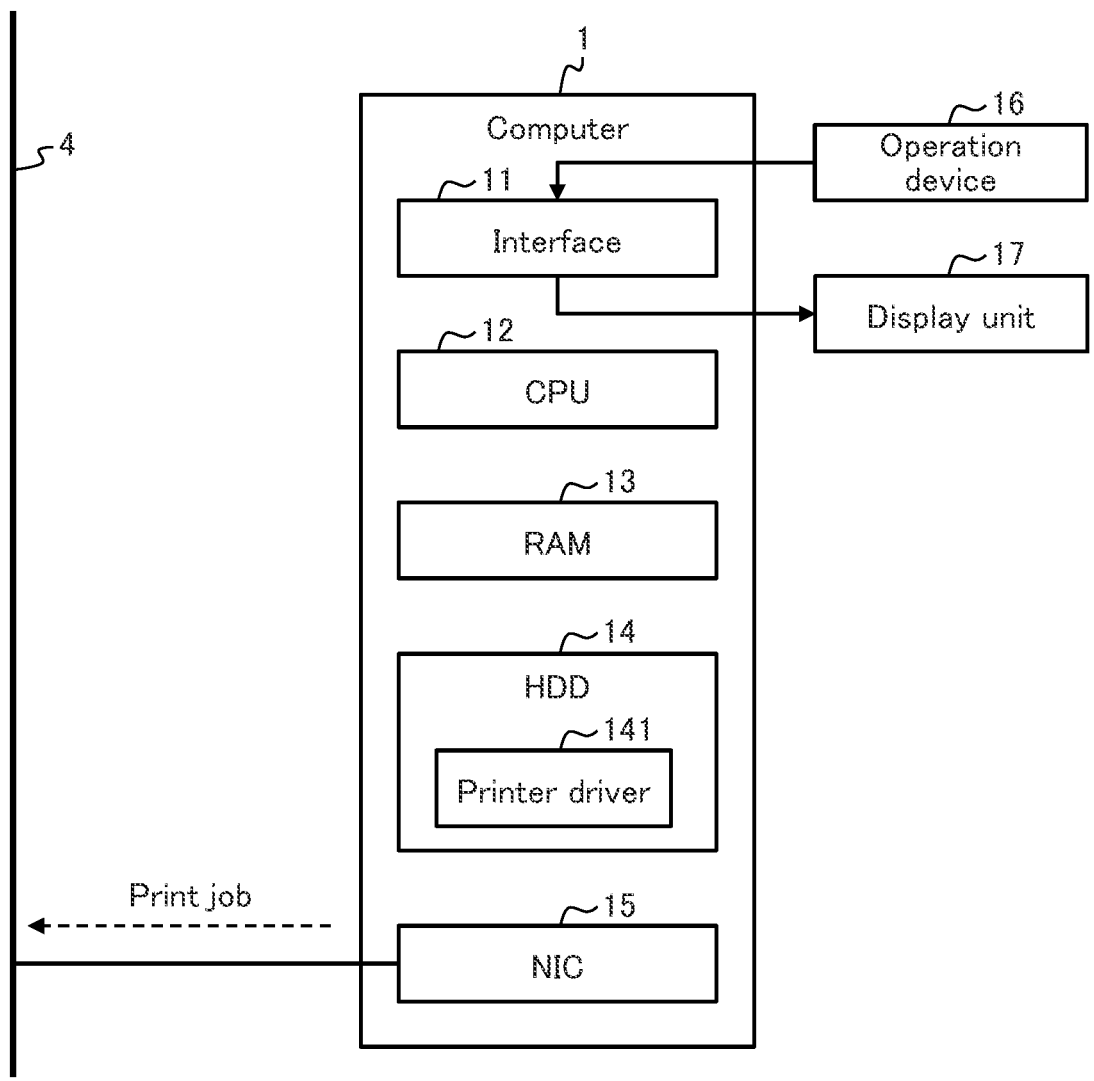
FIG. 2 is a hardware configuration of a computer.

FIG. 2 is a hardware configuration of the computer 1. The computer 1 includes a CPU (Central Processing Unit) 12, a RAM (Random Access Memory) 13, an HDD (Hard Disk Drive) 14, an interface 11, and a NIC (Network Interface Card) 15.

The CPU 12 is a central processing unit to integrally control the computer 1, such as retrieving and executing programs stored in the HDD 14. The RAM 13 is a volatile memory used as a temporary storage by the CPU 12. The HDD 14 is a mass-storage device to store programs, such as a printer driver 141, and various kinds of data. The printer driver 141 is a piece of software to operate a print device including the image processing device 2 and the image forming device 3.

The interface 11 includes a USB (Universal Serial Bus: a registered trademark) host controller and a GPU (Graphics Processing Unit), and is connected with one or more external devices such as an operation device 16 and a display unit 17 to work as an interface between the one or more external devices and the computer 1. The operation device 16 includes a keyboard, a computer mouse, and a touch panel. The display unit 17 includes an LCD display and an organic EL (electroluminescent) display and is used to check whether or not two or more print jobs are concurrently executed.

The NIC 15 is a network communication card to send/receive data to/from the image processing device 2 via the LAN 4.

Figure 3:
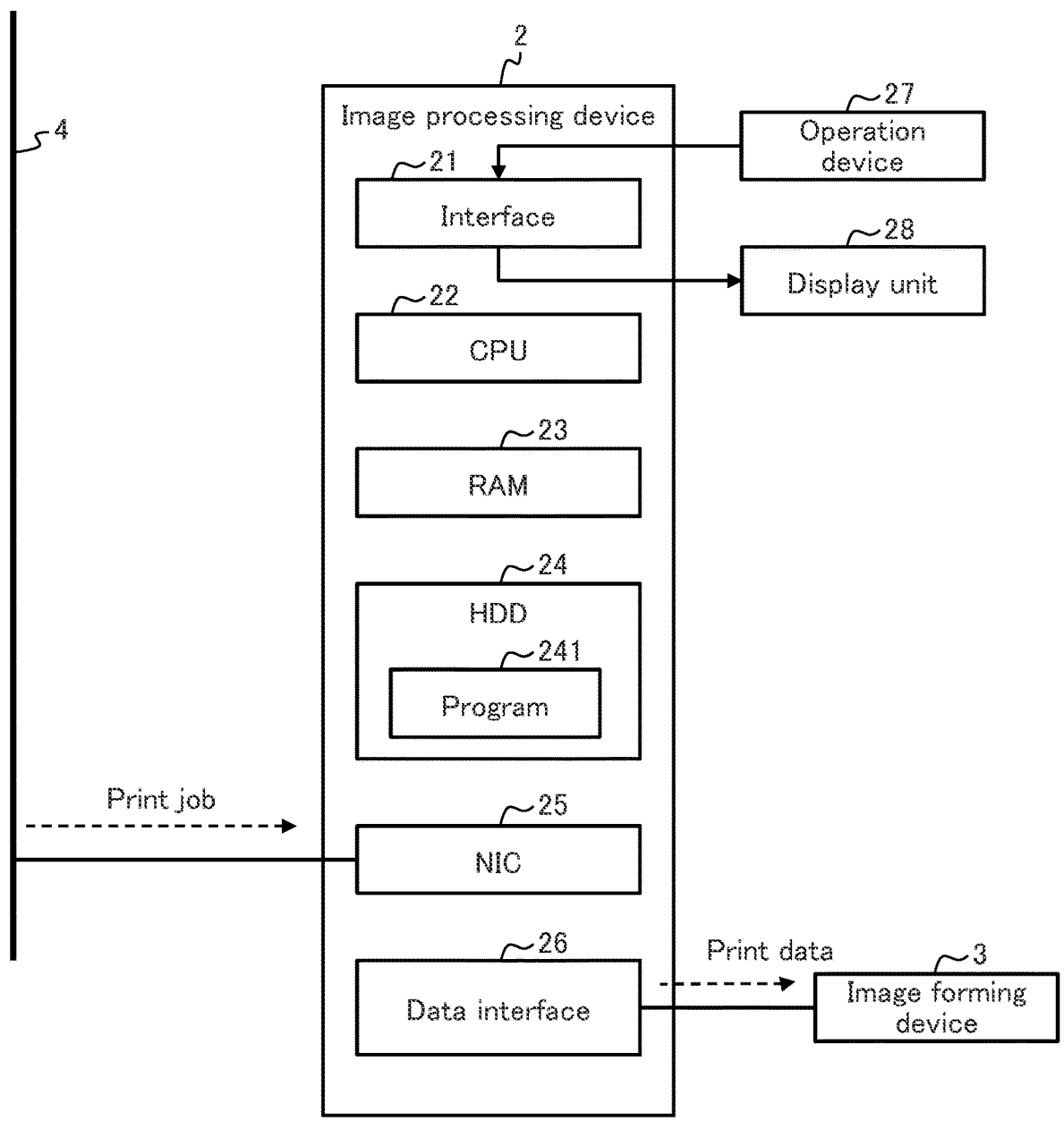
FIG. 3 is a hardware configuration of an image processing device.

FIG. 3 is a hardware configuration of the image processing device 2. The image processing device 2 is a computer including an interface 21, a CPU 22, a RAM 23, an HDD 24, an NIC 25, and a data interface 25.

The CPU 22 is a central processing unit to integrally control the image processing device 2, such as retrieving and executing programs stored in the HDD 24. The RAM 23 is a volatile memory used as a temporary storage by the CPU 22. The HDD 24 is a mass-storage device to store programs, such as a program 241, and various kinds of data. The program 241 is a piece of software to render and convert a print job taken from the computer 1 into print data and cause the image forming device 3 to execute a print job.

An operation device 27 includes a keyboard, a computer mouse, and a touch panel. A display unit 28 includes an LCD display and an organic EL display and is used to display a status of receiving one or more jobs, for example. The interface 21 includes a USB (Universal Serial Bus: a registered trademark) host controller and a GPU (Graphics Processing Unit), and is connected with one or more external devices such as the operation device 27 and the display unit 28 to work as an interface between the one or more external devices and the image processing device 2.

The NIC 25 is a network communication card to send/receive data to/from the computer 1 and the like via the LAN 4.

Figure 4:
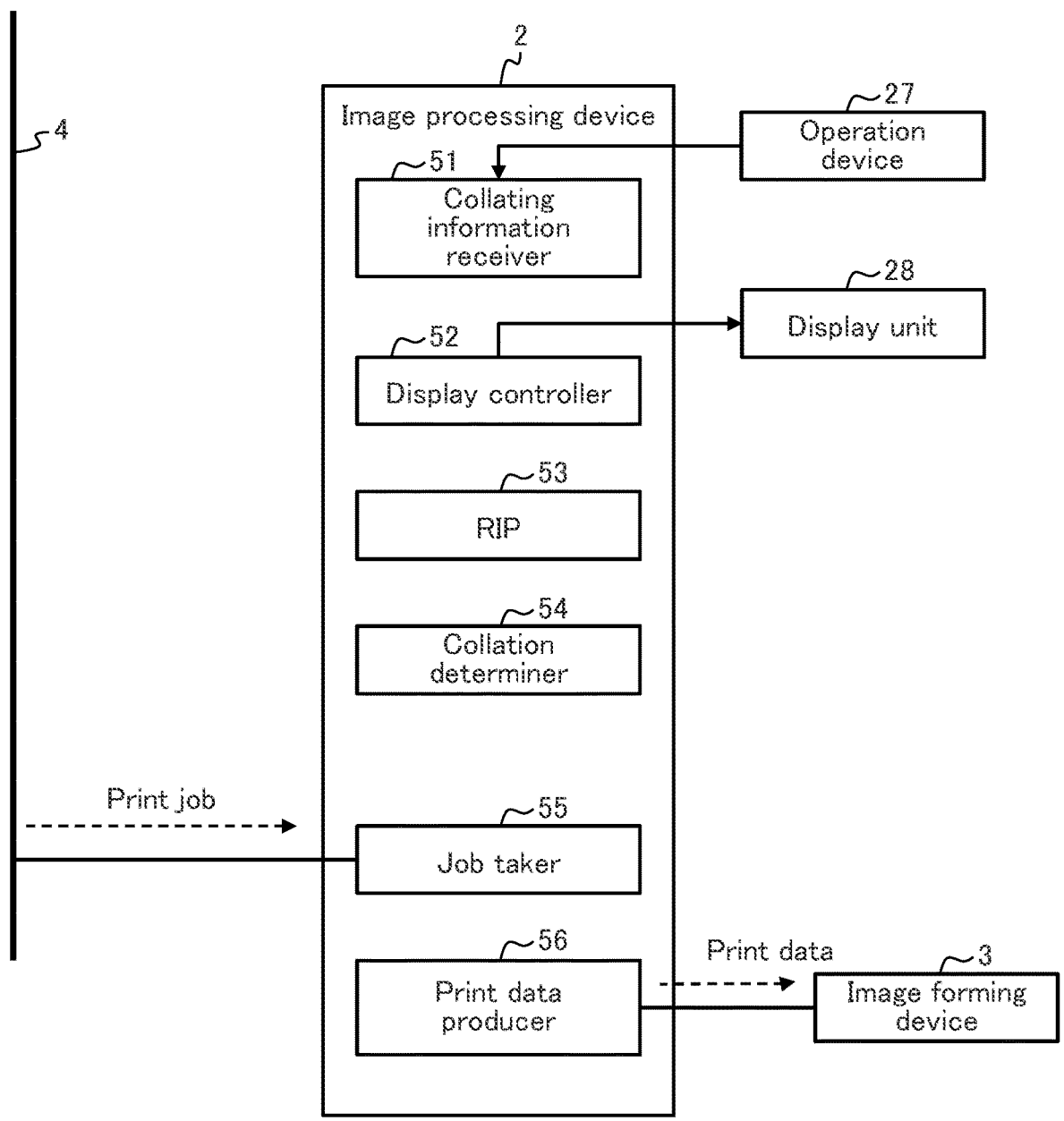
FIG. 4 is a logical block diagram of the image processing device.

FIG. 4 is a logical block diagram of the image processing device 2. The image processing device 2 includes function units of a collating information receiver 51, a display controller 52, a RIP (Raster Image Processor) 53, a collation determiner 54, a job taker 55, and a print data producer 56. These function units are embodied by the CPU 22 in FIG. 3 executing the program 241.

The job taker 55 takes a print job from the computer 1. The collation information receiver 51 receives an instruction from the operation device 27 about collation of a print job, if required. The display controller 52 controls contents to be displayed on the display unit 28. The RIP 53 converts a print job into print data in a raster image. The collation determiner 54, when a print job includes two or more pages, determines collation of the print job.

The print data producer 56 outputs print data to an image former 31 (see FIG. 5), configured to form an image on a sheet. The print data producer 56 further controls a cutter 33 (see FIG. 5), configured to cut, inline, sheets having images formed thereon. A description is given for a case where a first print job to use the cutter 33 is taken from the computer 1 and then a second print job not to use the cutter 33 is taken. The RIP 53 converts the first print job and the second print job into pieces of print data in a raster image, respectively. The collation determiner 54, when the first print job and the second print job each include two or more pages, determines collation of the respective pieces of print data. The print data producer 56 executes the first print job concurrently with the second print job.

Figure 5:
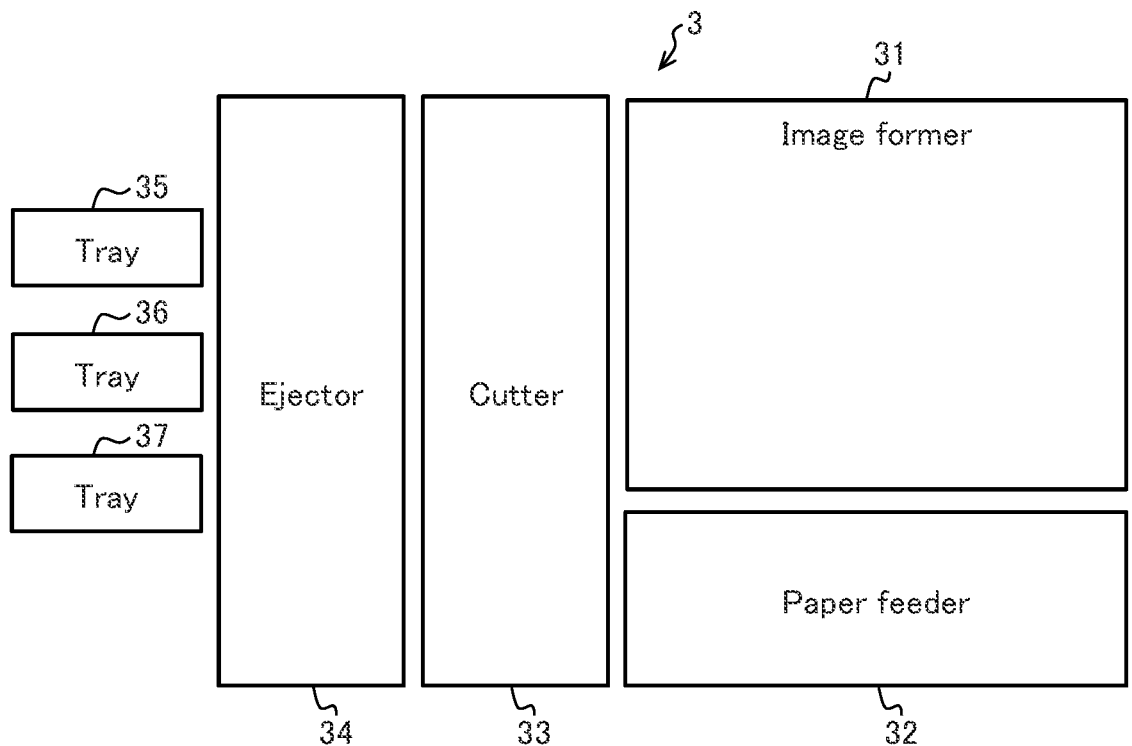
FIG. 5 is a block diagram of an image forming device.

FIG. 5 is a block diagram of the image forming device 3. The image forming device 3 includes an image former 31, a paper feeder 32, a cutter 33, an ejector 34, and trays 35 to 37. The image forming device 3 forms an image on a sheet as a record medium, such as a paper, and cuts the record medium based on a cutting parameter 62 of a print job 6 in FIG. 6.

Overall operation of the image forming device 3 is described below. The image forming device 3 receives print data from the image processing device 2, and then feeds one or more sheets (paper or the like) from the paper feeder 32. The fed sheet is formed with an image (printed) by the image former 31 and cut by the inline cutter 33 based on the cutting parameter 62 for the print job 6. The sheet having an image formed thereon or having been cut is ejected by the ejector 34 to one of the trays 35 to 37.

Figure 6:
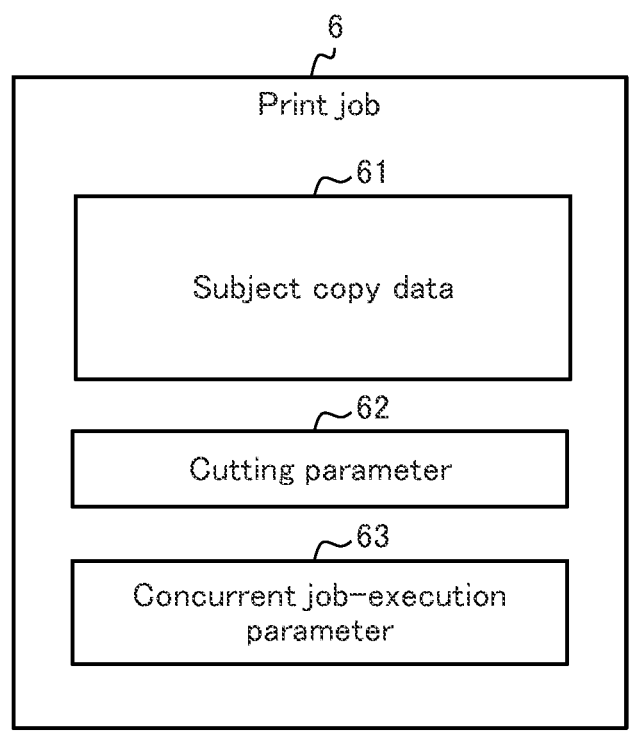
FIG. 6 shows data structure of a print job.

FIG. 6 shows data structure of the print job 6. The print job 6 includes subject copy data 61, the cutting parameter 62, and a concurrent job-execution parameter 63. The subject copy data 61 is data used to actually form an image. The cutting parameter 62 specifies whether or not a record medium having an image formed thereon is cut. The concurrent job-execution parameter 63 is a flag to allow the print job 6 to be concurrently executed or not.

Figure 7:
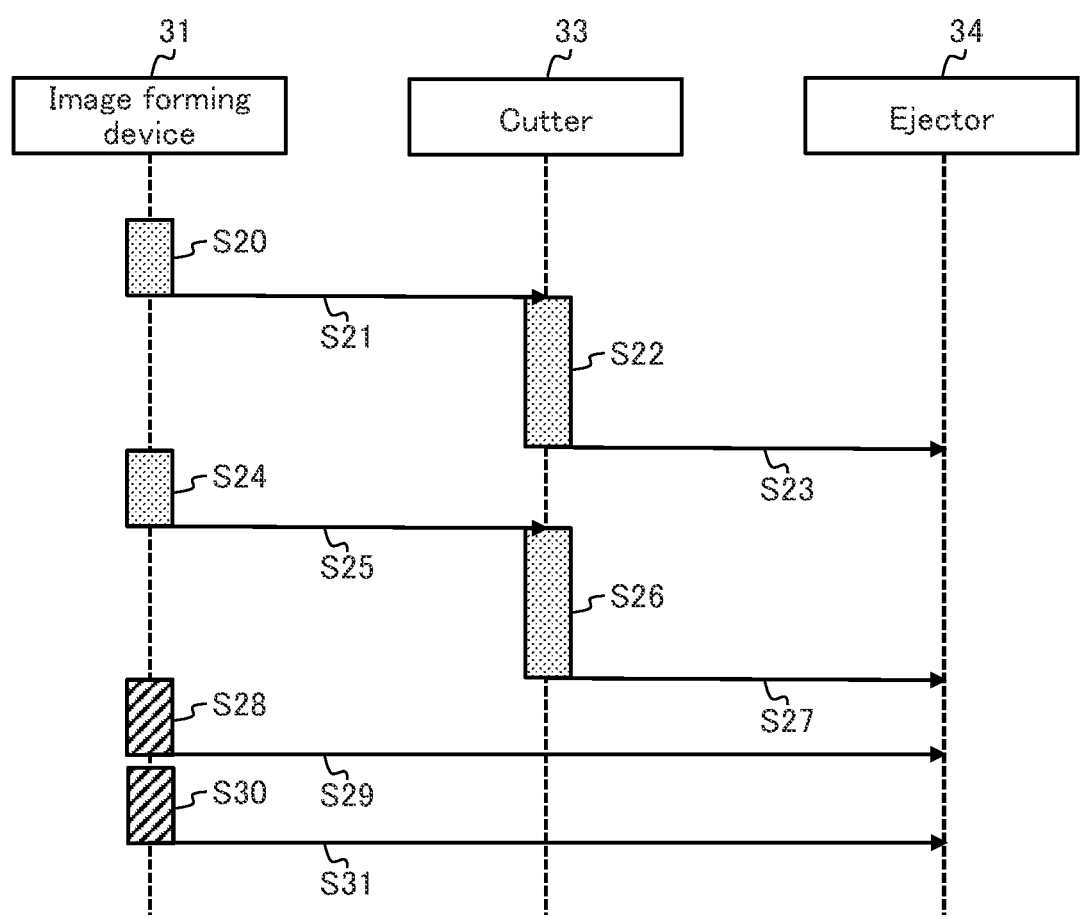
FIG. 7 is a sequence diagram when a first print job to use a cutter is sequentially executed with a second print job not to use any cutters.

FIG. 7 is a sequence diagram when a first print job to use the cutter 33 is sequentially executed with a second print job not to use the cutter 33. Steps S20 to S27 represent the first print job to use the cutter 33 and steps S28 to S31 represent the second print job not to use the cutter 33, with both jobs each printing two pages.

Page 1 of the first print job has an image formed by the image former 31 (S20), is transferred to the cutter 33 (S21), has predetermined cutting executed by the cutter 33 (S22), and is sent to the ejector 34 (S23).

When the cutter 33 has finished cutting page 1 of the first print job to become idle, page 2 of the first print job has an image formed by the image former 31 (S24), and has transfer (S25), cutting (S26), and ejection (S27) executed, as with page 1.

When page 2 of the first print job has been ejected, page 1 of the second print job has an image formed by the image former 31 (S28) and is sent to the ejector 34 (S29). When page 1 of the second print job has been ejected, page 2 of the second print job has an image formed by the image former 31 (S30) and is sent to the ejector 34 (S31).

Such operation causes the image former 31 to be less efficiently used due to delay in the cutter 33. Following embodiment describes in detail how to solve this problem.

Figure 8:
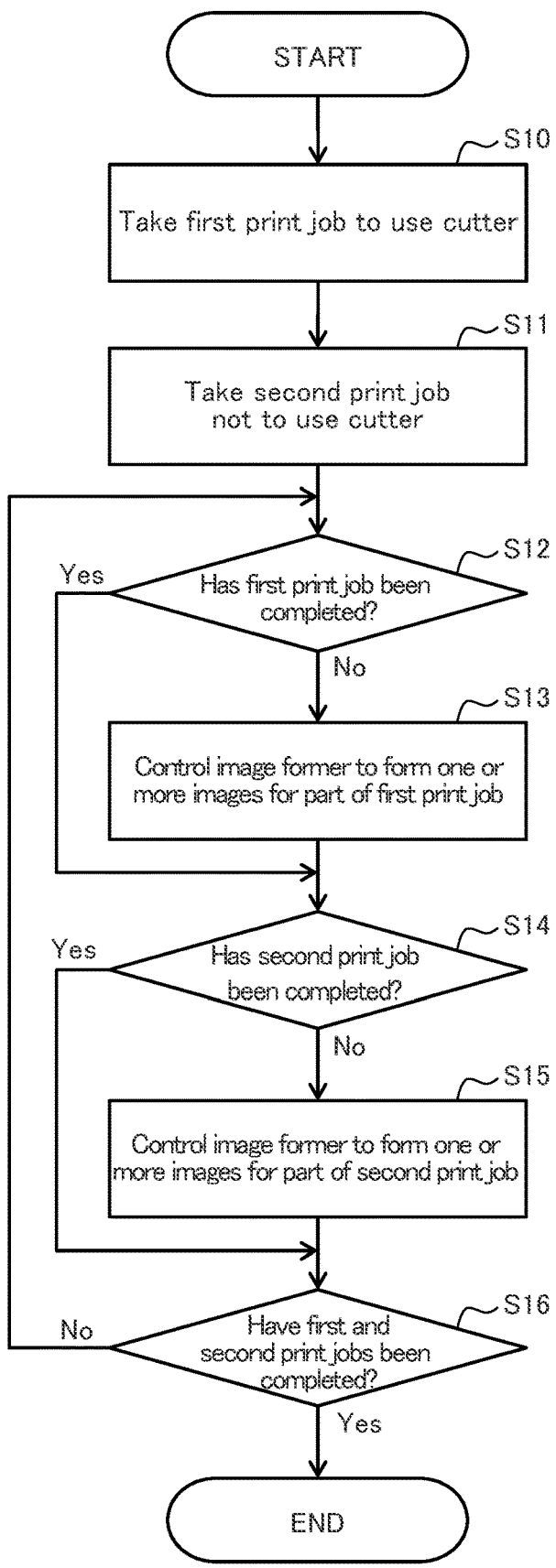
FIG. 8 is a flowchart of processing a first print job to use a cutter concurrently with a second print job not to use any cutters.

FIG. 8 is a flowchart of processing a first print job to use the cutter 33 concurrently with a second print job not to use the cutter 33. The image processing device 2 takes the first print job to use the cutter 33 from the computer 1 (S10), and then takes the second print job not to use the cutter 33 from the computer 1 (S11).

In step S12, the image processing device 2 determines whether or not the first print job has been completed. When the first print job has not been completed (No), the image processing device 2 controls the image former 31 to form one or more images on one or more sheets for a part of the first print job (S13) and then proceeds to step S14. When the first print job has been completed (Yes), the image processing device 2 proceeds to step S14.

In step S14, the image processing device 2 determines whether or not the second print job has been completed. When the second print job has not been completed (No), the image processing device 2 controls the image former 31 to form one or more images on one or more sheets for a part of the second print job (S15) and then proceeds to step S16. When the second print job has been completed (Yes), the image processing device 2 proceeds to step S16.

In step S16, the image processing device 2 determines whether or not both the first and second print jobs have been completed. When one of the first and second print jobs has not been completed (No), the image processing device 2 returns to step S12. When both the first and second print jobs have been completed (Yes), the image processing device 2 ends the process in FIG. 8.

That is, when the job taker 55 has taken the first print job to use the cutter 33 and then the second print job not to use the cutter 33 from the computer 1, the print data producer 56 executes the first print job concurrently with the second print job. This processing is described below in detail with reference to FIG. 9.

Figure 9:
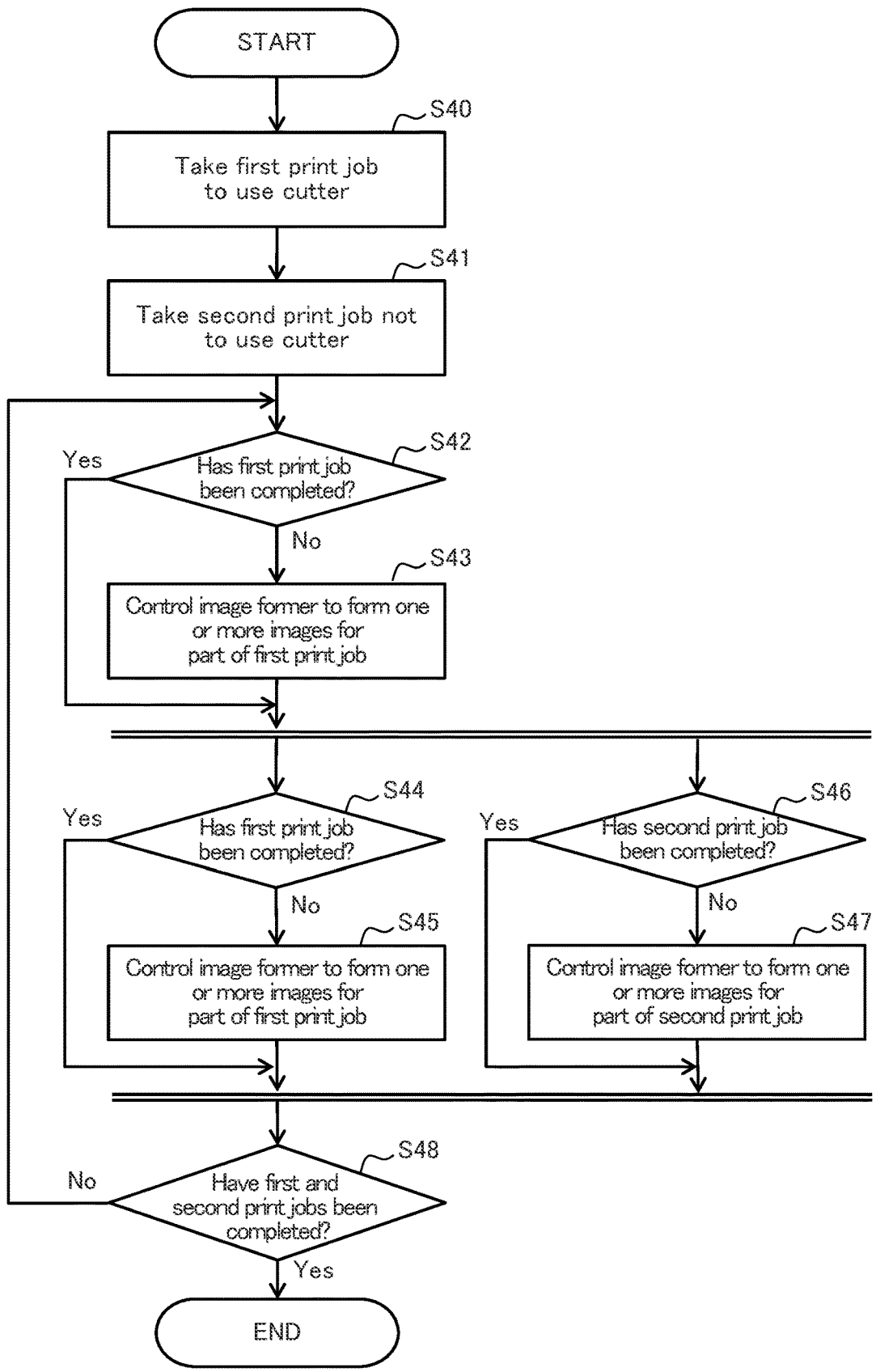
FIG. 9 is another flowchart of processing a first print job to use a cutter concurrently with a second print job not to use any cutters.

FIG. 9 is another flowchart of processing the first print job to use the cutter 33 concurrently with the second print job not to use the cutter 33. The job taker 55 of the image processing device 2 takes the first print job to use the cutter 33 from the computer 1 (S40), and then takes the second print job not to use the cutter 33 from the computer 1 (S41).

Then, the RIP 53 converts the first and second print jobs into pieces of print data in a raster image, respectively, and the collation determiner 54 determines collation of print data having the first and second print jobs rasterized. Details of these are not described here.

The print data producer 56 of the image processing device 2 determines whether or not the first print job has been completed (S42). When the first print job has not been completed (No), the print data producer 56 controls the image former 31 to have one or more images formed on one or more sheets for a part of the first print job (S43) and then proceeds to concurrent processing in steps S44 to S47. When the first print job has been completed (Yes), the print data producer 56 proceeds to concurrent processing in steps S44 to S47.

In step S44 of the concurrent processing, the print data producer 56 of the image processing device 2 determines whether or not the first print job has been completed. When the first print job has not been completed (No), the print data producer 56 controls the cutter 33 to cut one or more sheets for a part of the first print job (S45) and then proceeds to end the concurrent processing. When the first print job has been completed (Yes), the print data producer 56 proceeds to end the concurrent processing.

In step S46 of the concurrent processing, the print data producer 56 of the image processing device 2 determines whether or not the second print job has been completed. When the second print job has not been completed (No), the print data producer 56 controls the image former 31 to have one or more images formed on one or more sheets for a part of the second print job (S47) and then proceeds to end the concurrent processing. When the second print job has been completed (Yes), the print data producer 56 proceeds to end the concurrent processing. The concurrent processing ends when both the processing in steps S44, S45 and the processing in steps S46, S47 have ended, and proceeds to processing in step S48.

That is, the print data producer 56 controls the image former 31 to form one or more images on one or more sheets for the second print job not to use the cutter 33, while the cutter 33 is cutting sheets for the first print job. This allows the image forming system S to reduce influence from delay by the cutter 33 as a post-processor and effectively utilize resources of the image former 31, to have higher productivity.

In step 48, the print data producer 56 of the image processing device 2 determines whether or not both the first and second print jobs have been completed. When one of the first and second print jobs has not been completed (No), the print data producer 56 returns to step S42. When both the first and second print jobs have been completed (Yes), the print data producer 56 ends the process in FIG. 9.

Figure 10:
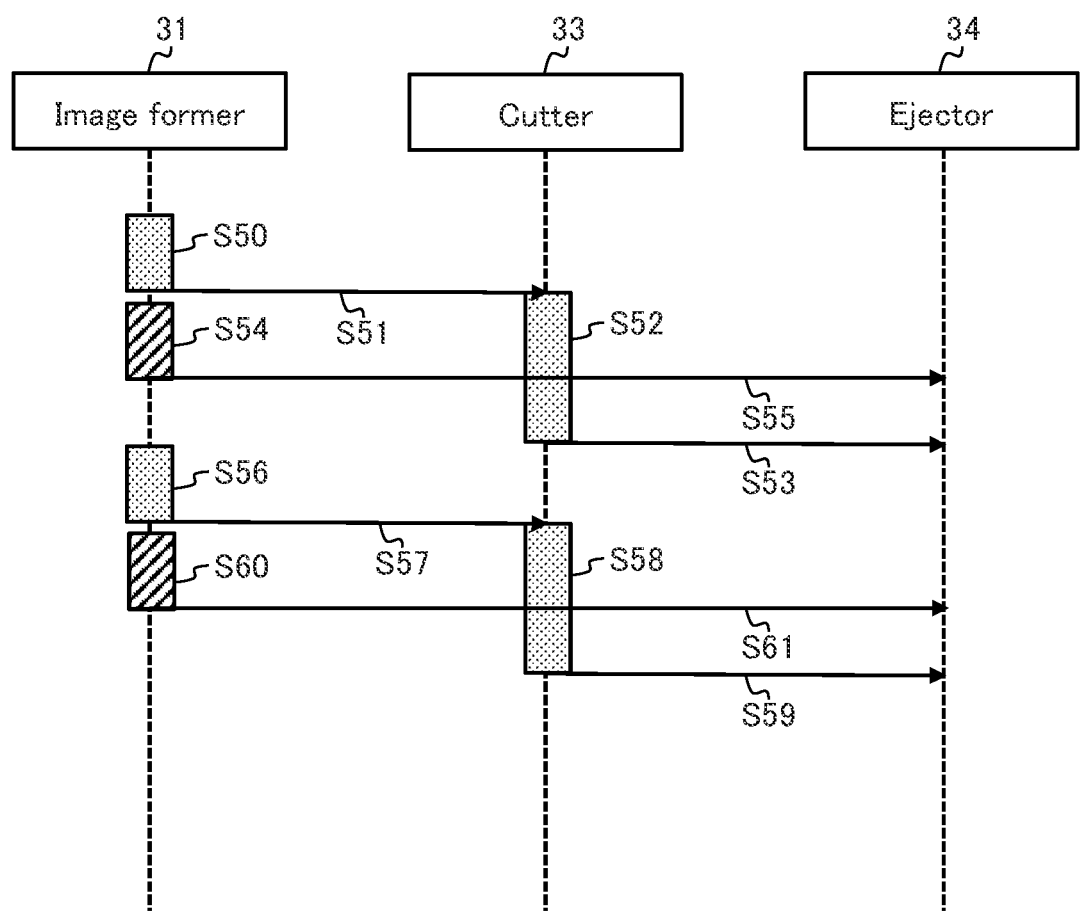
FIG. 10 is a sequence diagram when a first job to use a cutter is executed concurrently with a second print job not to use any cutters.

FIG. 10 is a sequence diagram when a first job to use the cutter 33 is executed concurrently with a second print job not to use the cutter 33.

Page 1 of the first print job has an image formed by the image former 31 (550), and is transferred to the cutter 33 (551). Page 1 of the first print job has predetermined cutting executed by the cutter 33 (552). Concurrently with this processing, page 1 of the second print job has an image formed by the image former 31 (554) and is sent to the ejector 34 (555). When cutting by the cutter 33 has finished, page 1 of the first print job is sent to the ejector 34 (553).

Then, page 2 of the first print job has an image formed by the image former 31 (556), and is transferred to the cutter 33 (S57). Page 2 of the first print job has predetermined cutting executed by the cutter 33 (558). Concurrently with this processing, page 2 of the second print job has an image formed by the image former 31 (S60) and is sent to the ejector 34 (S61). When cutting by the cutter 33 has finished, page 2 of the first print job is sent to the ejector 34 (559).

That is, the image forming system S forms images on pages for the second print job, while pages for the first print jobs are being cut. Pages of the second print job are sent to the ejector 34, without waiting for completion of cutting the pages for the first print job. This allows the image forming system S to reduce influence from delay by the cutter 33 as a post-processor and effectively utilize resources of the image former 31, to have higher productivity.

Note that the image forming system S may control the image former 31 to form images on two or more sheets for the second print job not to use the cutter 33, while the cutter 33 is cutting sheets for the first print job.

Figure 11:
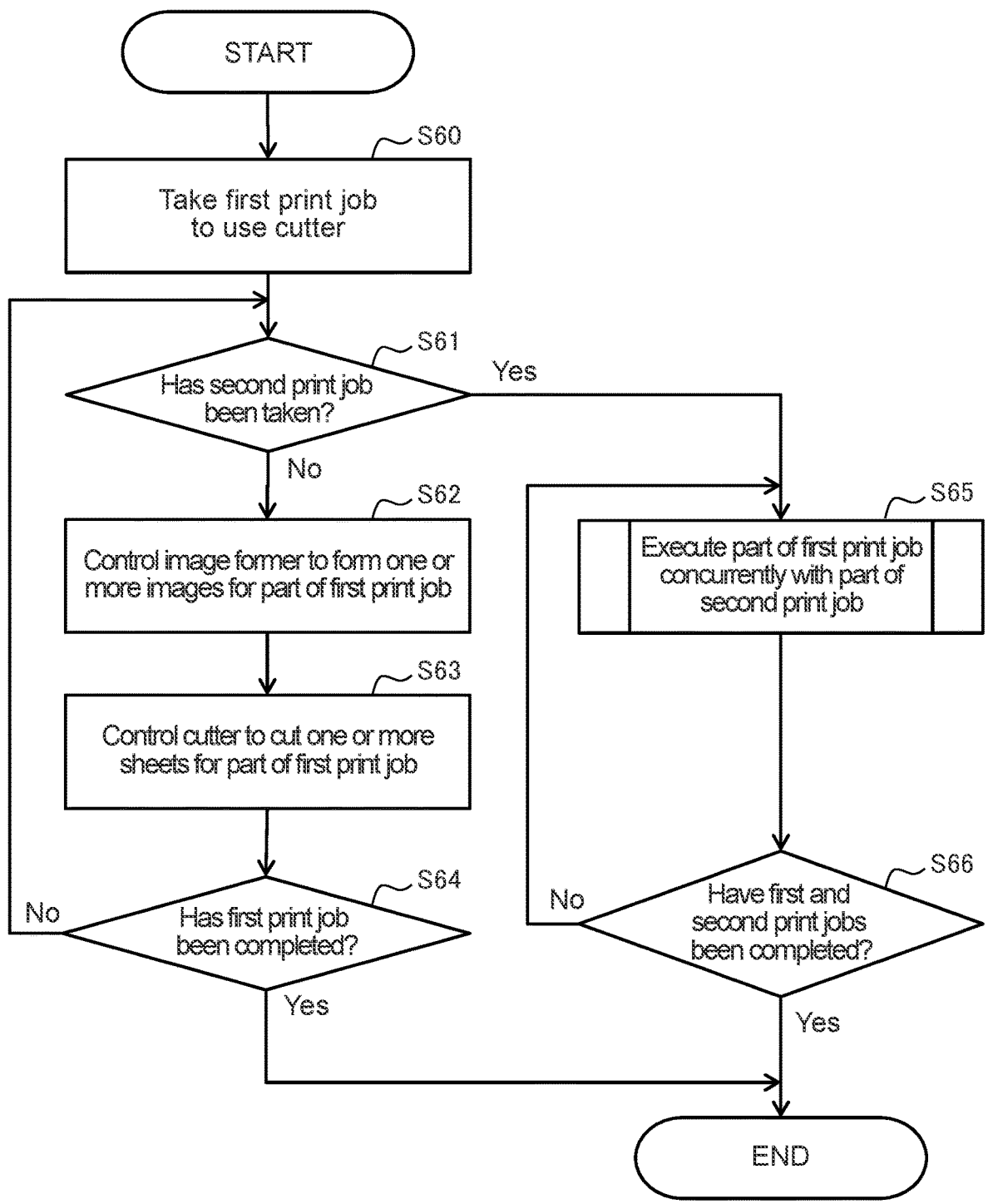
FIG. 11 is a flowchart of a case where a second job not to use any cutters has been taken during execution of a first print job to use a cutter.

FIG. 11 is a flowchart of a case where a second job not to use the cutter 33 has been taken during execution of a first print job to use the cutter 33. The job taker 55 of the image processing device 2 takes the first print job to use the cutter 33 from the computer 1 (S60). Then, it is determined in step S61 whether or not the job taker 55 has taken the second print job not to use the cutter 33.

The print data producer 56 of the image processing device 2 proceeds to step S65 when the job taker 55 has taken the second print job (Yes), and proceeds to step S62 when the job taker 55 has not taken the second print job (No).

In step S62, the print data producer 56 controls the image former 31 to form one or more images on one or more sheets for a part of the first print job. Then, the print data producer 56 controls the cutter 33 to cut one or more sheets for a part of the first print job (S63) and determines whether or not the first print job has been completed (S64).

In step S64, when the first print job has not been completed (No), the print data producer 56 returns to step S61. When the first print job has been completed (Yes), the print data producer 56 ends the process in FIG. 11.

In step S65, the print data producer 56 of the image processing device 2 executes a part of the first print job concurrently with a part of the second print job. Processing in step S65 is described in detail below, with reference to FIG. 12. Then in step S66, the print data producer 56 determines whether or not both the first and second print jobs have been completed. When one of the first and second print jobs has not been completed (No), the print data producer 56 returns to step S65. When both the first and second print jobs have been completed (Yes), the print data producer 56 ends the process in FIG. 11.

That is, when the job taker 55 has taken the second print job not to use the cutter 33 during execution of the first print job to use the cutter 33, the print data producer 56 controls the image former 31 to alternately form images for a part of the first print job and images for a part of the second print job in a time-sharing manner. In other words, the print data producer 56 executes the first print job concurrently with the second print job.

Figure 12:
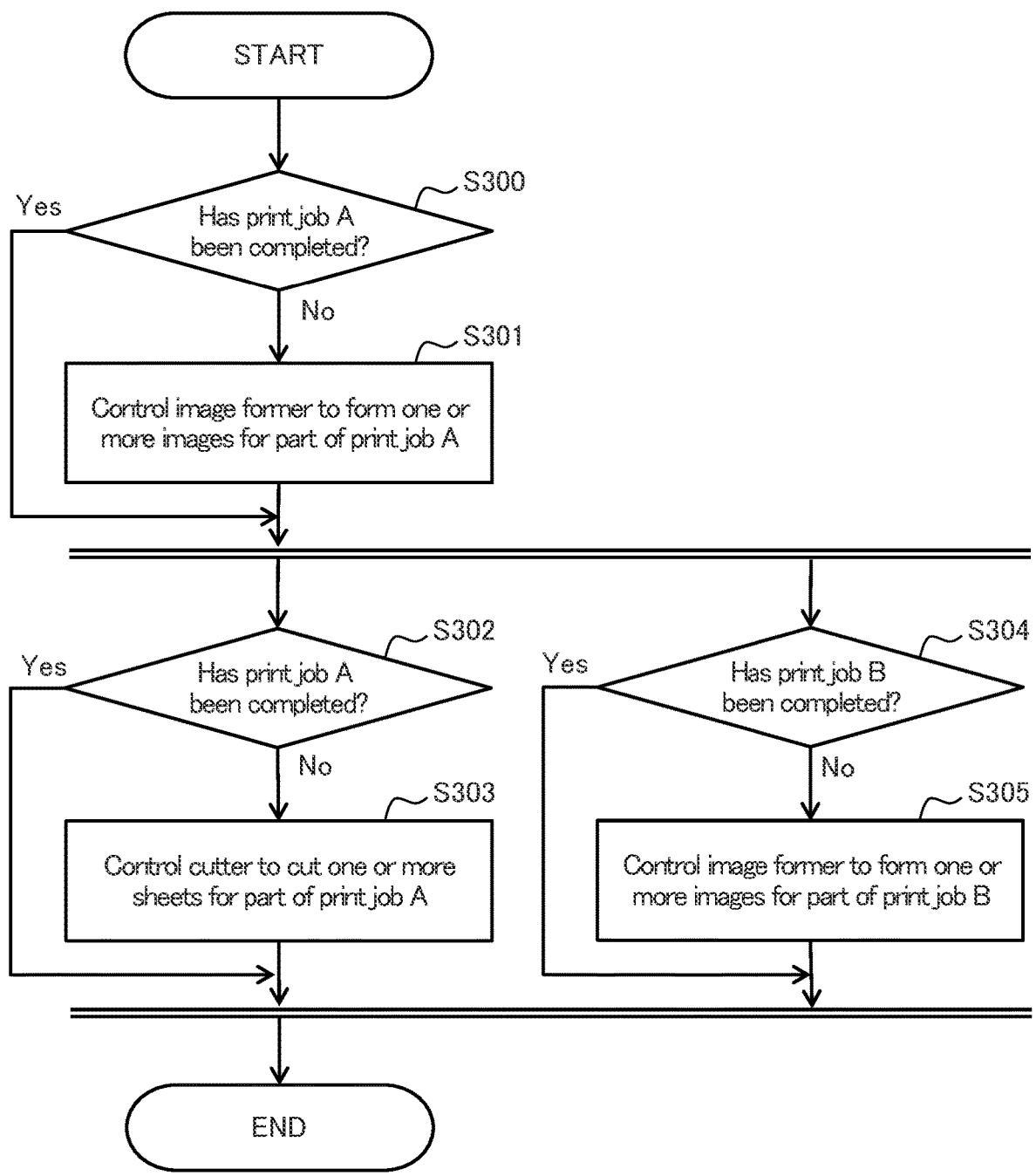
FIG. 12 is a flowchart of processing a part of a print job A to use a cutter concurrently with a part of a print job B not to use any cutters.

FIG. 12 is a flowchart of processing a part of a print job A to use the cutter 33 concurrently with a part of a print job B not to use the cutter 33. This process is invoked by step S65 in FIG. 11, for example.

The print data producer 56 of the image processing device 2 determines whether or not the print job A has been completed (S300). When the print job A has not been completed (No), the print data producer 56 controls the image former 31 to form one or more images for a part of the print job A (S301), and proceeds to concurrent processing. When the print job A has been completed (Yes), the print data producer 56 proceeds to concurrent processing.

In step S302 of the concurrent processing, the print data producer 56 of the image processing device 2 determines whether or not the print job A has been completed. When the print job A has not been completed (No), the print data producer 56 controls the cutter 33 to cut a part of the print job A (S303), and proceeds to end of the concurrent processing. When the print job A has been completed (Yes), the print data producer 56 proceeds to end of the concurrent processing.

In step S304 of the concurrent processing, the print data producer 56 of the image processing device 2 determines whether or not the print job B has been completed. When the print job B has not been completed (No), the print data producer 56 controls the image former 31 to form one or more images for a part of the print job B (S305), and proceeds to end of the concurrent processing. After both the processing in steps S302, S303 and the processing in steps S304, S305 have ended, the print data producer 56 ends the concurrent processing and ends the process in FIG. 12.

Figure 13:
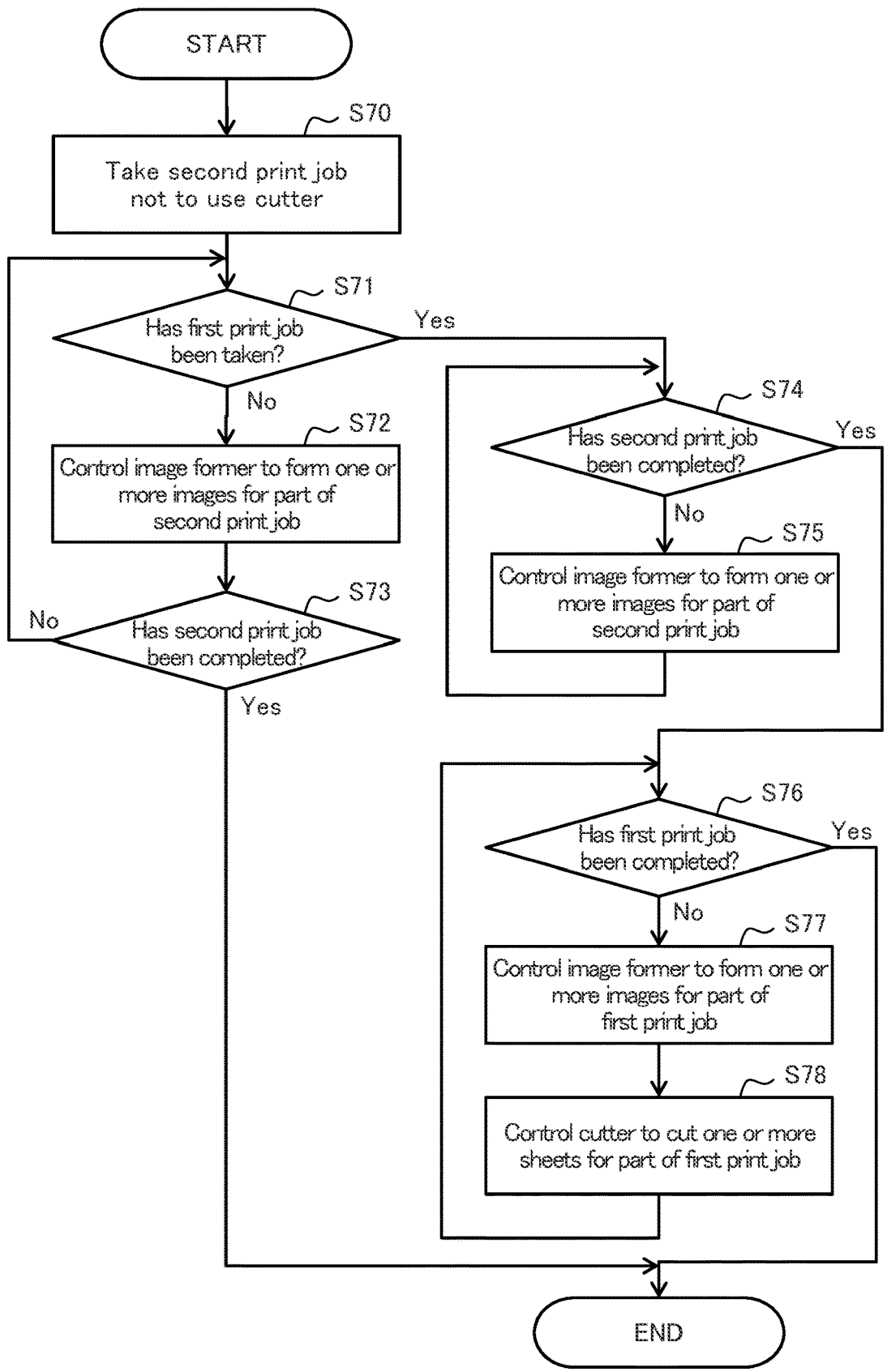
FIG. 13 is a flowchart of a case where a first job to use a cutter has been taken during execution of a second job not to use any cutters.

FIG. 13 is a flowchart of a case where a first print job to use the cutter 33 has been taken during execution of a second print job not to use the cutter 3. The job taker 55 of the image processing device 2 takes the second print job not to use the cutter 33 from the computer 1 (S70). Then, it is determined in step S71 whether or not the job taker 55 has taken the first print job to use the cutter 33.

The processing proceeds to step S74 when the first print job has been taken by the job taker 55 of the image processing device 2 (Yes), and proceeds to step S72 when the first print job has not been taken (No). In step S72, the data producer 56 of the image processing device 2 controls the image former 31 to form one or more images on one or more sheets for a part of the second print job. The print data producer 56 then determines whether or not the second print job has been completed (S73).

In step S73, when the second print job has not been completed (No), the print data producer 56 of the image processing device 2 returns to step S71. When the second print job has been completed (Yes), the print data producer 56 ends the process in FIG. 13.

In step S74, the print data producer 56 of the image processing device 2 determines whether or not the second print job has been completed. When the second print job has not been completed (No), the print data producer 56 controls the image former 31 to form one or more images on one or more sheets for a part of the second print job (S75), and returns to step S74. When the second print job has been completed (Yes), the print data producer 56 proceeds to processing in step S76.

In step S76, the print data producer 56 of the image processing device 2 determines whether or not the first print job has been completed. When the first print job has not been completed (No), the print data producer 56 controls the image former 31 to form one or more images on one or more sheets for a part of the first print job (S77), controls the cutter 33 to cut the one or more sheets, and returns to step S76. When the first print job has been completed (Yes), the print data producer 56 ends the process in FIG. 13.

That is, in the case where the first print job to use the cutter 33 has been taken during execution of the second print job not to use the cutter 3, the print data producer 56 executes the second print job and then executes the first print job. In other words, the print data producer 56 does not execute the second print job concurrently with the first print job.

Figure 14:
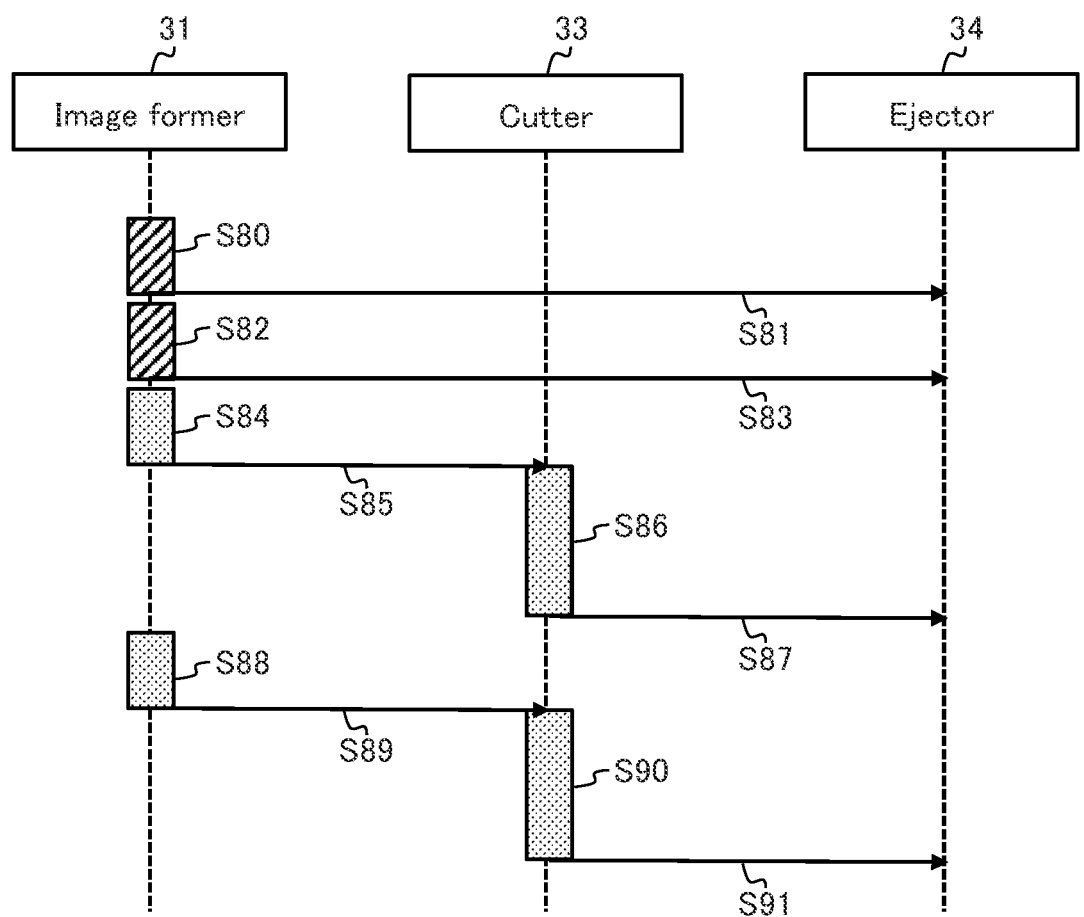
FIG. 14 is a sequence diagram when a first print job to use a cutter has been taken during execution of a second print job not to use any cutters.

FIG. 14 is a sequence diagram when a first print job to use the cutter 33 has been taken during execution of a second print job not to use the cutter 33. Page 1 of the second print job has an image formed by the image former 31 (S80), and is sent to the ejector 34 (S81). When page 1 of the second print job has been ejected, page 2 of the second print job has an image formed by the image former 31 (S82), and is sent to the ejector 34 (S83).

When page 2 of the second print job has been ejected, page 1 of the first print job has an image formed by the image former 31 (S84), is transferred to the cutter 33 (S85) and has predetermined cutting executed by the cutter 33 (S86), and is sent to the ejector 34 (S87).

When the cutter 33 has finished cutting page 1 of the first print job to become idle, page 2 of the first print job has an image formed by the image former 31 (S88), and has transfer (S89), cutting (S90), and ejection (S91) executed, as with page 1.

When the first print job has been taken during execution of the second print job, the second print job is not executed concurrently with the first print job, but is executed in a sequential order. This is because completion of the second print job is actually deferred if the second print job is executed concurrently with the first print job.

Figure 15:
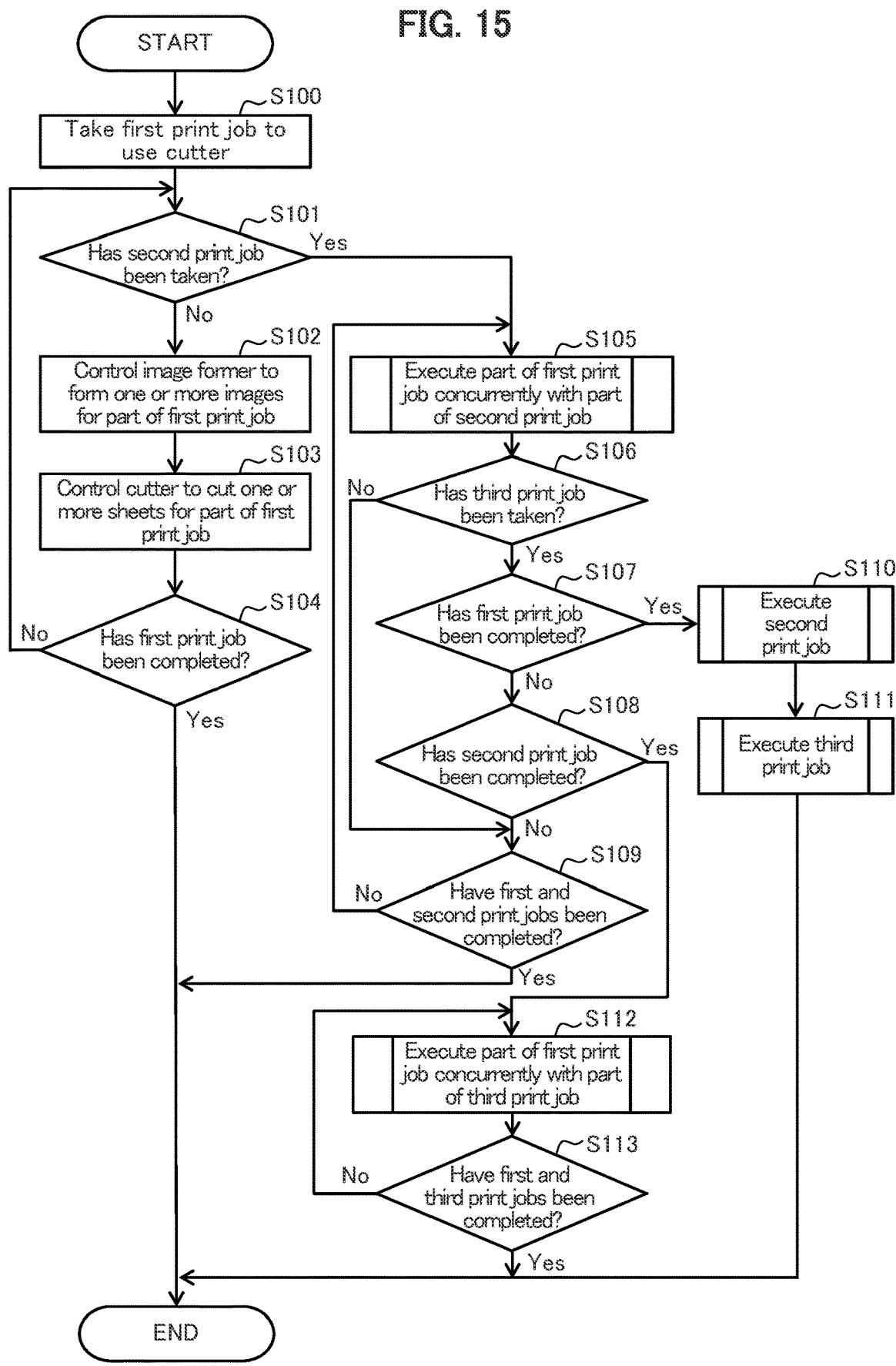
FIG. 15 is a flowchart of a case where a second print job not to use any cutters has been taken and executed. during execution of a first print job to use a cutter, resulted in completion of the second print job, and a third print job not to use any cutters has been taken.

FIG. 15 is a flowchart of a case where a second print job not to use the cutter 33 has been taken from the computer 1 and executed, during execution of a first print job to use the cutter 33, resulted in completion of the second print job, and a third print job not to use the cutter 33 has been taken from the computer 1.

The job taker 55 of the image processing device 2 takes the first print job to use the cutter 33 (S100). Then, it is determined in step S101 whether or not the job taker 55 has taken the second print job not to use the cutter 33.

The job taker 55 proceeds to step S105 when the second print job has been taken (Yes), and proceeds to step S102 when the second print job has not been taken (No). In step S102, the data producer 56 of the image processing device 2 controls the image former 31 to form one or more images on one or more sheets for a part of the first print job. The print data producer 56 then controls the cutter 33 to cut one or more sheets for a part of the first print job (S103) and determines whether or not the first print job has been completed (S104).

In step S104, when the first print job has not been completed (No), the print data producer 56 of the image processing device 2 returns to step S101. When the first print job has been completed (Yes), the print data producer 56 ends the process in FIG. 15.

In step S105, the print data producer 56 of the image processing device 2 executes a part of the first print job concurrently with a part of the second print job. Processing in step S105 is the process shown in FIG. 12. In step S106, it is determined whether or not the job taker 55 of the image processing device 2 has taken a third print job not to use the cutter 33. The processing proceeds to processing in step S107 when the job taker 55 has taken the third print job (Yes), and proceeds to processing in step S109 when the job taker 55 has not taken the third print job not to use the cutter 33 (No).

In step S107, the print data producer 56 of the image processing device 2 determines whether or not the first print job has been completed. The print data producer 56 proceeds to step S108 when the first print job has not been completed (No), and proceeds to processing in step S110 when the first print job has been completed (Yes).

In step S110, the print data producer 56 executes the second print job. The print data producer 56 then executes the third print job (S111), and ends the process in FIG. 15.

In step S108, the print data producer 56 of the image processing device 2 determines whether or not the second print job has been completed. The print data producer 56 proceeds to step S109 when the second print job has not been completed (No), and proceeds to processing in step S112 when the second print job has been completed (Yes).

In step S112, the print data producer 56 of the image processing device 2 executes a part of the first print job concurrently with a part of the third print job. Processing in step S112 is the process shown in FIG. 12. The print data producer 56 then determines whether or not both the first and third print jobs have been completed. When one of the first and third print jobs has not been completed (No), the print data producer 56 returns to step S112. When both the first and third print jobs have been completed (Yes), the print data producer 56 ends the process in FIG. 15.

In step S109, the print data producer 56 determines whether or not both the first and second print jobs have been completed. When one of the first and second print jobs has not been completed (No), the print data producer 56 returns to step S105. When both the first and second print jobs have been completed (Yes), the print data producer 56 ends the process in FIG. 15.

That is, in the case where the first print job to use the cutter 33 has been executed concurrently with the second print job not to use the cutter 33, resulted in completion of the second print job, and the third print job not to use the cutter 33 has been taken by the job taker 55, the print data producer 56 executes the first print job concurrently with the third print job. This allows the image forming system S to reduce influence from delay by the cutter 33 as a post-processor and effectively utilize resources of the image former 31, to have higher productivity.

Figure 16:
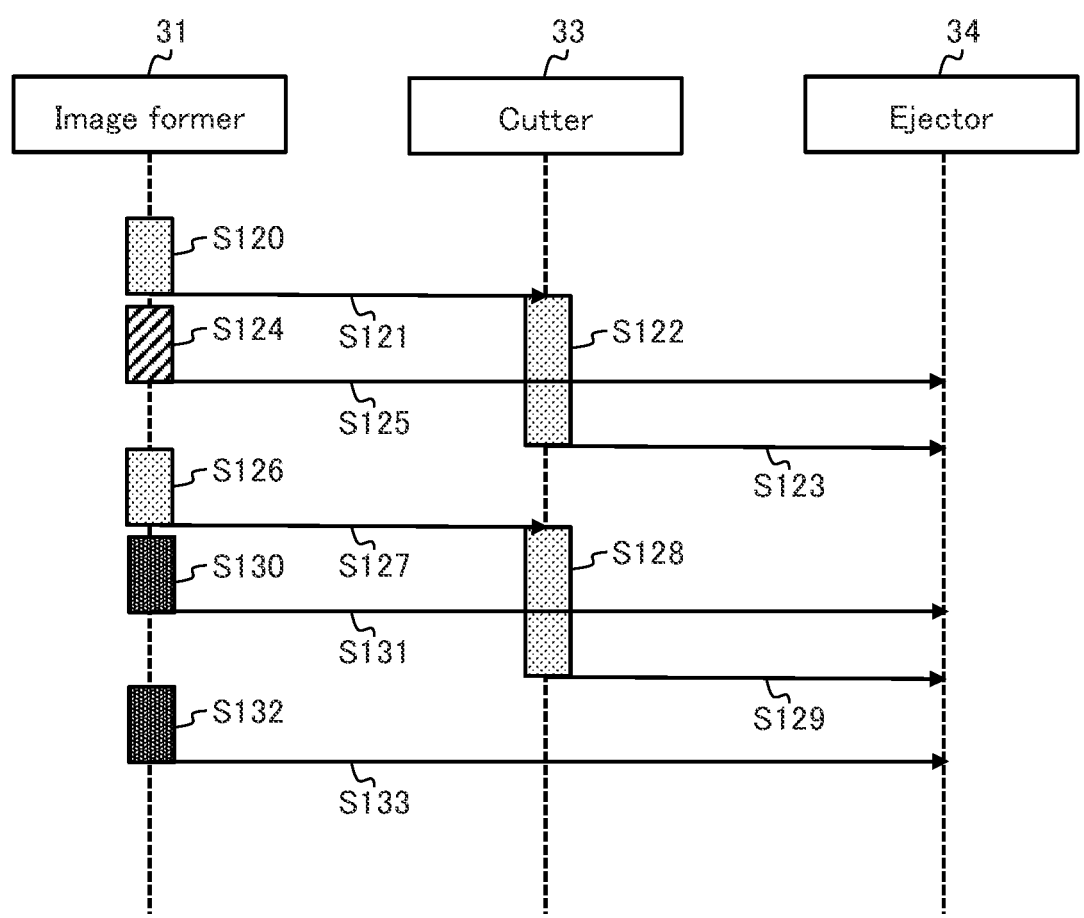
FIG. 16 is a sequence diagram in a case where a second print job not to use any cutters has been taken and executed, during execution of a first print job to use a cutter, resulted in completion of the first print job, and a third print job not to use any cutters has been taken.

FIG. 16 is a sequence diagram in a case where a second print job not to use the cutter 33 has been taken from the computer 1 and executed, during execution of a first print job to use the cutter 33, resulted in completion of the first print job, and a third print job not to use the cutter 33 has been taken from the computer 1.

Steps S120 to S123 and steps S126 to S129 represent the first print job to use the cutter 33, with the first print job printing two pages. Steps S124 to S125 represent the second print job not to use the cutter 33, with the second print job printing one page. Steps S130 to S133 represent the third print job not to use the cutter 33, with the third print job printing two pages.

Page 1 of the first print job has an image formed by the image former 31 (S120) and is transferred to the cutter 33 (S121). Page 1 of the first print job has predetermined cutting executed by the cutter 33 (S122). Concurrently, page 1 of the second print job has an image formed by the image former 31 (S124) and is sent to the ejector 34 (S125). Page 1 of the first print job, after having been cut by the cutter 33, is sent to the ejector 34 (S123).

Then, page 2 of the first print job has an image formed by the image former 31 (S126) and is transferred to the cutter 33 (S127). Page 2 of the first print job has predetermined cutting executed by the cutter 33 (S128). Concurrently, page 1 of the third print job has an image formed by the image former 31 (S130) and is sent to the ejector 34 (S131). Page 2 of the first print job, after having been cut by the cutter 33, is sent to the ejector 34 (S129).

Then, page 2 of the third print job has an image formed by the image former 31 (S132) and is sent to the ejector 34 (S133).

That is, the image forming system S executes the first print job concurrently with the second print job. When the second print job is completed earlier than the first print job and then a third print job not to use the cutter 33 is received, the image forming system S executes the first print job concurrently with the third print job.

Figure 17:
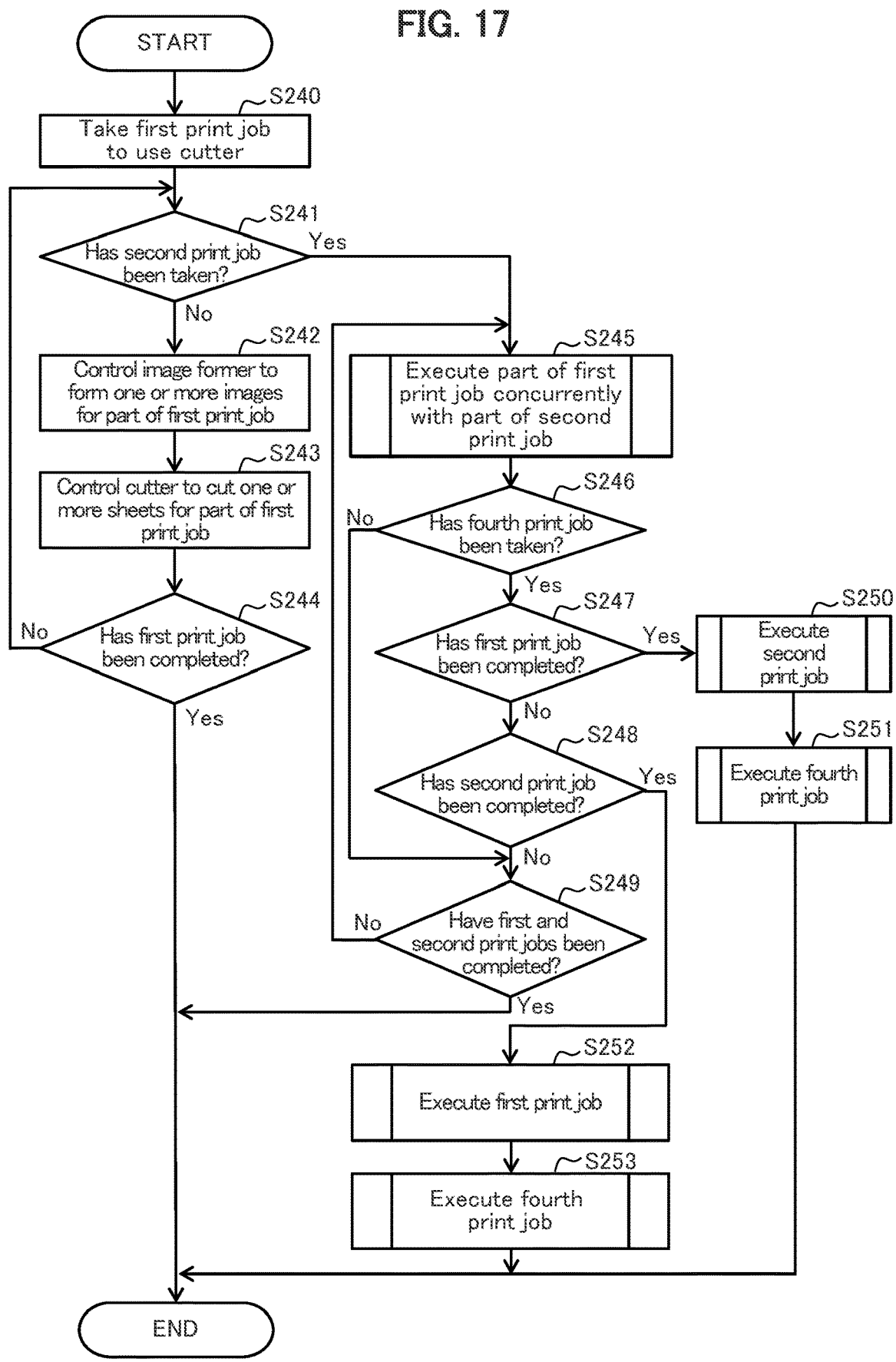
FIG. 17 is a flowchart of a case where a second print job not to use any cutters has been taken and executed, during execution of a first print job to use a cutter, and a fourth first print job to use a cutter has been taken.

FIG. 17 is a flowchart of a case where a second print job not to use the cutter 33 has been taken from the computer 1 and executed, during execution of a first print job to use the cutter 33, and a fourth first print job to use the cutter 33 has been taken from the computer 1.

The job taker 55 of the image processing device 2 takes the first print job to use the cutter 33 (S240). Then, it is determined in step S241 whether or not the job taker 55 has taken the second print job not to use the cutter 33.

The job taker 55 of the image processing device 2 proceeds to step S245 when the second print job has been taken (Yes), and proceeds to step S242 when the second print job has not been taken (No).

In step S242, the print data producer 56 of the image processing device 2 controls the image former 31 to form one or more images on one more sheets for a part of the first print job. The print data producer 56 then controls the cutter 33 to cut the one or more sheets for a part of the first print job (S243), and determines whether or not the first print job has been completed (S244).

In step S244, when the first print job has not been completed (No), the print data producer 56 of the image processing device 2 returns to step S241. When the first print job has been completed (Yes), the print data producer 56 ends the process in FIG. 17.

In step S245, the print data producer 56 of the image processing device 2 executes a part of the first print job concurrently with a part of the second print job. The processing in step S245 is the process shown in FIG. 12. In step S246, it is determined whether or not the job taker 55 of the image processing device 2 has taken a fourth print job to use the cutter 33. The job taker 55 proceeds to processing in step S247 when the fourth print job has been taken (Yes), and proceeds to processing in step S249 when the fourth print job has not been taken (No).

In step S247, the print data producer 56 of the image processing device 2 determines whether or not the first print job has been completed. The print data producer 56 proceeds to step S248 when the first print job has not been completed (No), and proceeds to processing in step S250 when the first print job has been completed (Yes).

In step S250, the print data producer 56 of the image processing device 2 executes the second print job. The print data producer 56 then executes the fourth print job (S251), and ends the process in FIG. 17.

In step S248, the print data producer 56 of the image processing device 2 determines whether or not the second print job has been completed. The print data producer 56 proceeds to step S249 when the second print job has not been completed (No), and proceeds to processing in step S252 when the second print job has been completed (Yes).

In step S252, the print data producer 56 of the image processing device 2 executes the first print job. The print data producer 56 then executes the fourth print job (S253), and ends the process in FIG. 17.

In step S249, the print data producer 56 of the image processing device 2 determines whether or not both the first and second print jobs have been completed. When one of the first and second print jobs has not been completed (No), the print data producer 56 returns to step S245. When both the first and second print jobs have been completed (Yes), the print data producer 56 ends the process in FIG. 17.

That is, in the case where the first print job to use the cutter 33 has been executed concurrently with the second print job not to use the cutter 33, resulted in completion of the first print job, and the fourth print job to use the cutter 33 has been taken by the job taker 55, the print data producer 56 executes the second print job and then executes the fourth print job. This is because completion of the second print job is actually deferred if the second print job is executed concurrently with the fourth print job.

Figure 18:
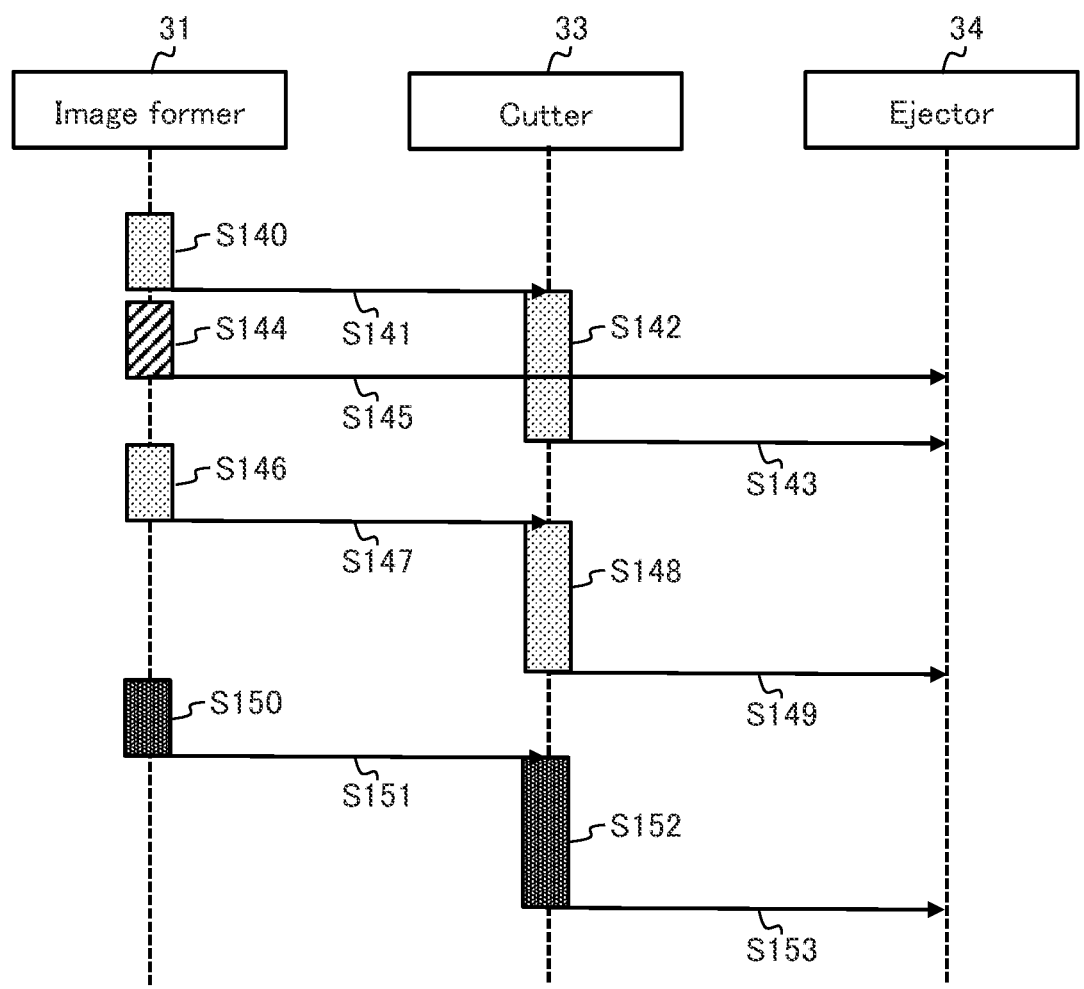
FIG. 18 is a sequence diagram in a case where a second print job not to use any cutters has been taken and executed, during execution of a first print job to use a cutter, and the second print job has been completed earlier than the first print job and a fourth print job to use a cutter has been taken.

FIG. 18 is a sequence diagram in a case where a second print job not to use the cutter 33 has been taken from the computer 1 and executed, during execution of a first print job to use the cutter 33, and the second print job has been completed earlier than the first print job and a fourth print job to use the cutter 33 has been taken from the computer 1. Steps S140 to S143 and steps S146 to S149 represent the first print job to use the cutter 33, with the first print job printing two pages. Steps S144 to S145 represent the second print job not to use the cutter 33, with the second print job printing one page. Steps S150 to S153 represent the fourth print job not to use the cutter 33, with the fourth print job printing one page.

Page 1 of the first print job has an image formed by the image former 31 (S140) and is transferred to the cutter 33 (S141). Page 1 of the first print job has predetermined cutting executed by the cutter 33 (S142). Concurrently, page 1 of the second print job has an image formed by the image former 31 (S144) and is sent to the ejector 34 (S145). Page 1 of the first print job, after having been cut by the cutter 33, is sent to the ejector 34 (S143).

Then, page 2 of the first print job has an image formed by the image former 31 (S146) and is transferred to the cutter 33 (S147). Page 2 of the first print job has predetermined cutting executed by the cutter 33 (S148) and is sent to the ejector 34 (S149). Then, page 1 of the fourth print job has an image formed by the image former 31 (S150) and is transferred to the cutter 33 (S151). Page 1 of the fourth print job has predetermined cutting executed by the cutter 33 (S152) and is sent to the ejector 34 (S153).

That is, the image forming system S executes the first print job concurrently with the second print job. When the second print job is completed earlier than the first print job and then the fourth print job to use the cutter 33 is received, the image forming system S executes the first print job and the fourth print job sequentially, not concurrently.

Figure 19:
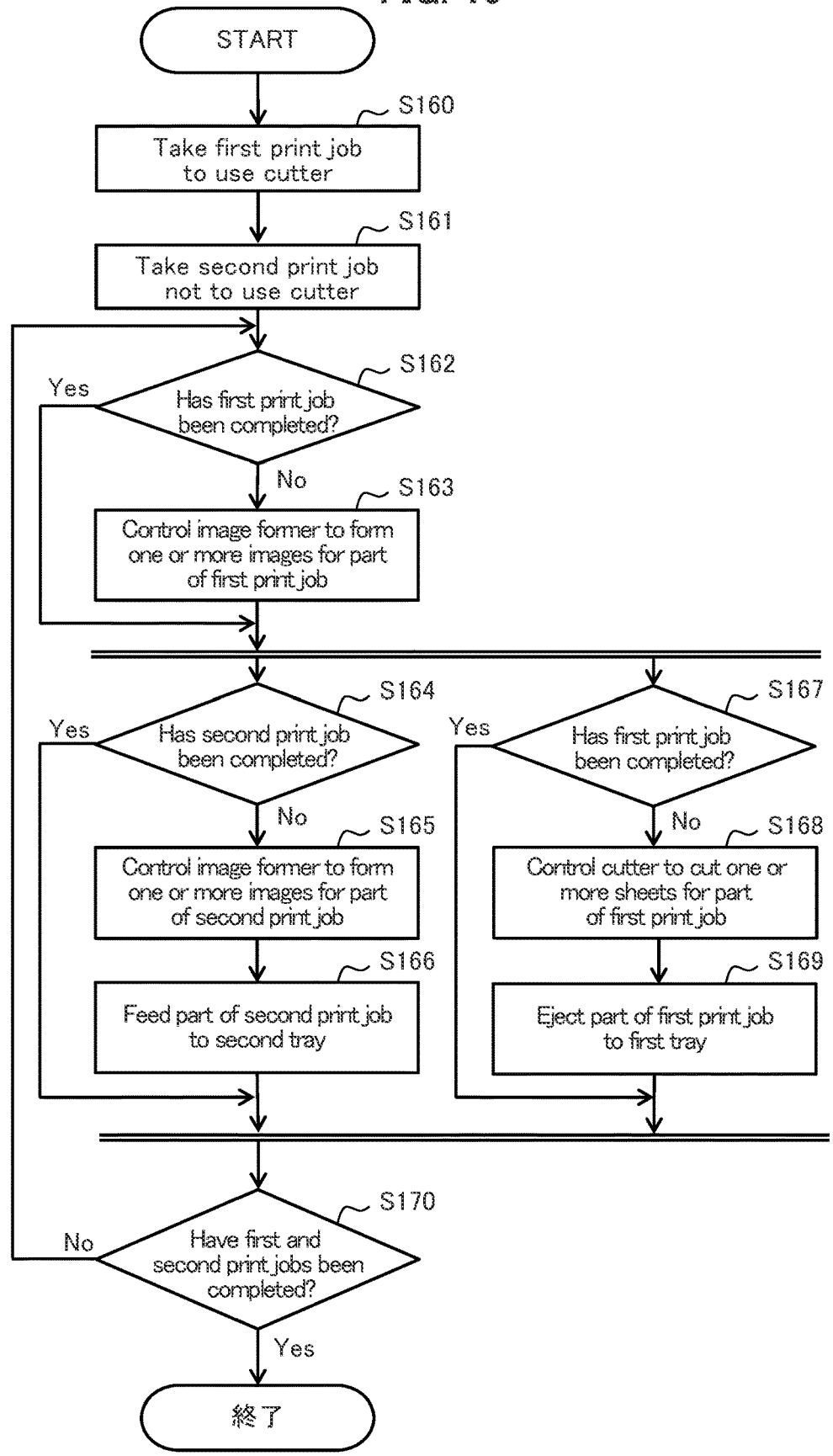
FIG. 19 is a flowchart of a case where a first print job to use a cutter has been ejected to a first tray concurrently with a second print job not to use any cutters having been ejected to a second tray.

FIG. 19 is a flowchart of a case where a first print job to use the cutter 33 has been ejected to a first tray concurrently with a second print job not to use the cutter 33 having been ejected to a second tray. The job taker 55 of the image processing device 2 takes the first print job to use the cutter 33 (S160), and then takes the second print job not to use the cutter 33 (S161).

The print data producer 56 of the image processing device 2 determines whether or not the first print job has been completed (S162). When the first print job has not been completed (No), the print data producer 56 controls the image former 31 to form one or more images on one more sheets for a part of the first print job (S163) and then proceeds to concurrent processing in steps S164 to S169. When the first print job has been completed (Yes), the print data producer 56 proceeds to concurrent processing in steps S164 to S169.

In step S164, the print data producer 56 of the image processing device 2 determines whether or not the second print job has been completed. When the second print job has not been completed (No), the print data producer 56 controls the image former 31 to form one or more images on one or more sheets for a part of the second print job (S165), ejects the one or more sheets to a second tray (S166), and proceeds to end of the concurrent processing. When the second print job has been completed (Yes), the print data producer 56 proceeds to end of the concurrent processing.

In step S167 of the concurrent processing, the print data producer 56 of the image processing device 2 determines whether or not the first print job has been completed. When the first print job has not been completed (No), the print data producer 56 controls the cutter 33 to cut the sheets for a part of the first print job (S168), ejects the sheets to the first tray (S169), and proceeds to the concurrent processing, When the first print job has been completed (Yes), the print data producer 56 proceeds to end of the concurrent processing. The concurrent processing ends when both the processing in steps S164 to S166 and the processing in steps S167 to S169 end, and the print data producer 56 proceeds to processing in step S170.

In step S170, the print data producer 56 of the image processing device 2 determines whether or not both the first and second print jobs have been completed. When one of the first and second print jobs has not been completed (No), the print data producer 56 returns to step S162. When both the first and second print jobs have been completed (Yes), the print data producer 56 ends the process in FIG. 19.

That is, the ejector 34 ejects the cut sheets to one of the trays 35 to 37. The print data producer 56 then controls the ejector 34 to eject the one or more sheets having one or more images formed for the first print job on one tray and the one or more sheets having one or more images formed for the second print job on another tray. This allows the sheets having images for two or more print jobs to be ejected to different trays from one another, even when the jobs are concurrently executed. In this manner, the image forming system S can separately output the results of two or more print jobs.

Figure 20:
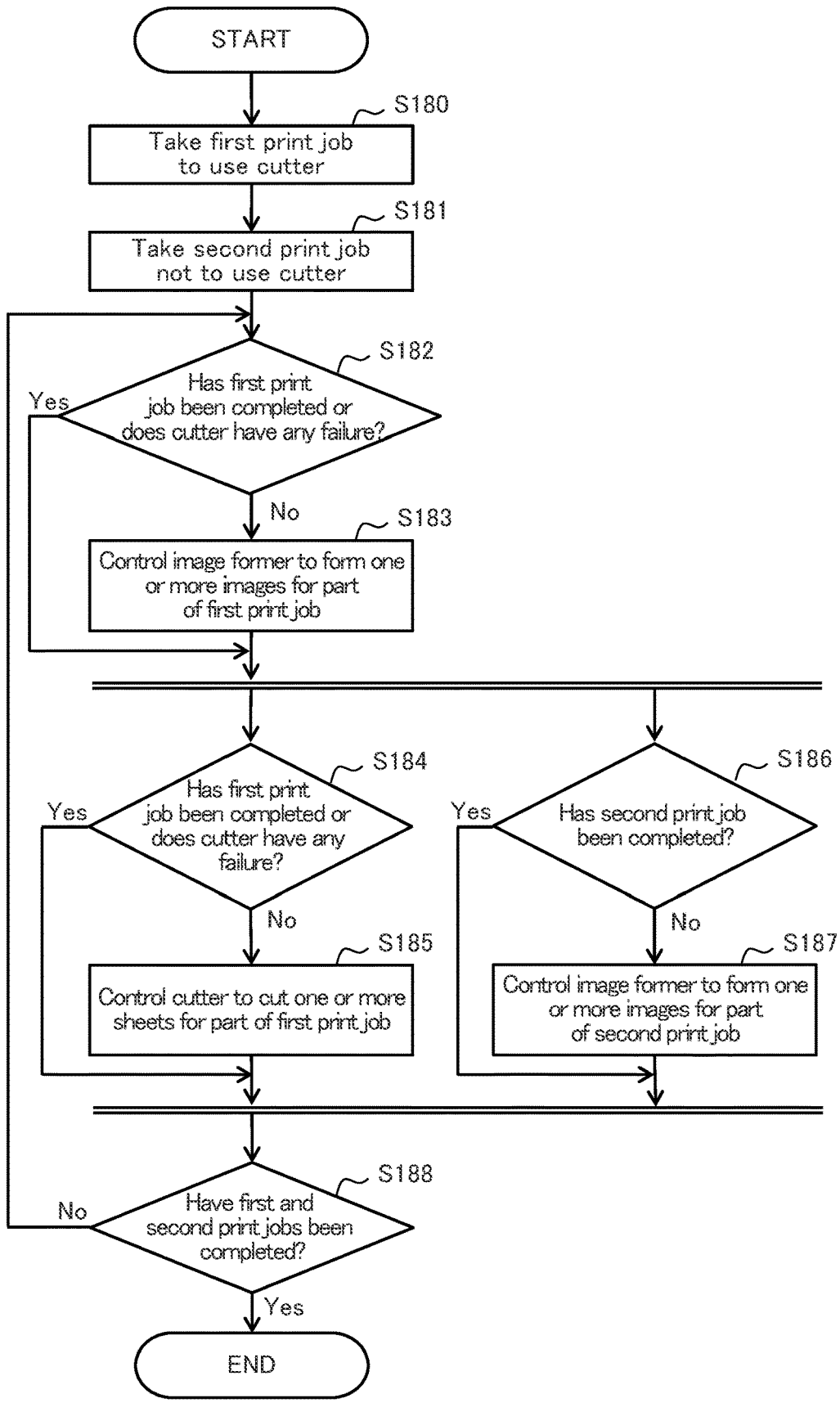
FIG. 20 is a flowchart of a case where a first print job to use a cutter is executed concurrently with a second print job not to use any cutters, in consideration of a failure at the cutter.

FIG. 20 is a flowchart of a case where a first print job to use the cutter 33 is executed concurrently with a second print job not to use the cutter 33, in consideration of a failure at the cutter 33. The job taker 55 of the image processing device 2 takes the first print job to use the cutter 33 (S180), and then takes the second print job not to use the cutter 33 from the computer 1 (S181).

The print data producer 56 of the image processing device 2 determines whether or not the first print job has been completed or the cutter 33 has had any failures (S182). When the first print job has not been completed and the cutter 33 has had no failures (No), the print data producer 56 controls the image former 31 to form one or more images on one more sheets for a part of the first print job (S183) and then proceeds to concurrent processing in steps S184 to S187. When the first print job has been completed or the cutter 33 has had a failure (Yes), the print data producer 56 proceeds to concurrent processing in steps S184 to S187.

In step S184 of the concurrent processing, the print data producer 56 of the image processing device 2 determines whether or not the first print job has been completed or the cutter 33 has had any failures. When the first print job has not been completed and the cutter 33 has had no failures (No), the print data producer 56 controls the cutter 33 to cut the sheets for a part of the first print job (S185), and proceeds to end of the concurrent processing. When the first print job has been completed or the cutter 33 has had a failure (Yes), the print data producer 56 proceeds to end of the concurrent processing.

In step S186 of the concurrent processing, the print data producer 56 of the image processing device 2 determines whether or not the second print job has been completed. When the second print job has not been completed (No), the print data producer 56 controls the image former 31 to form one or more images on one or more sheets for a part of the second print job (S187), and proceeds to end of the concurrent processing. When the second print job has been completed (Yes), the print data producer 56 proceeds to end of the concurrent processing. The concurrent processing ends when both the processing in steps S184, S185 and the processing in steps S186, S187 end, and the print data producer 56 proceeds to processing in step S188.

In step S186, the print data producer 56 of the image processing device 2 determines whether or not both the first and second print jobs have been completed. When one of the first and second print jobs has not been completed (No), the print data producer 56 returns to step S182. When both the first and second print jobs have been completed (Yes), the print data producer 56 ends the process in FIG. 20.

That is, if the cutter 33 has had a failure when the first print job to use the cutter 33 has been executed concurrently with the second print job not to use the cutter 33, the print data producer 56 interrupts the first print job and continuously executes the second print job. This allows the second print job not to use the cutter 33 to be completed, even when the cutter 33 has had a failure.

Figure 21:
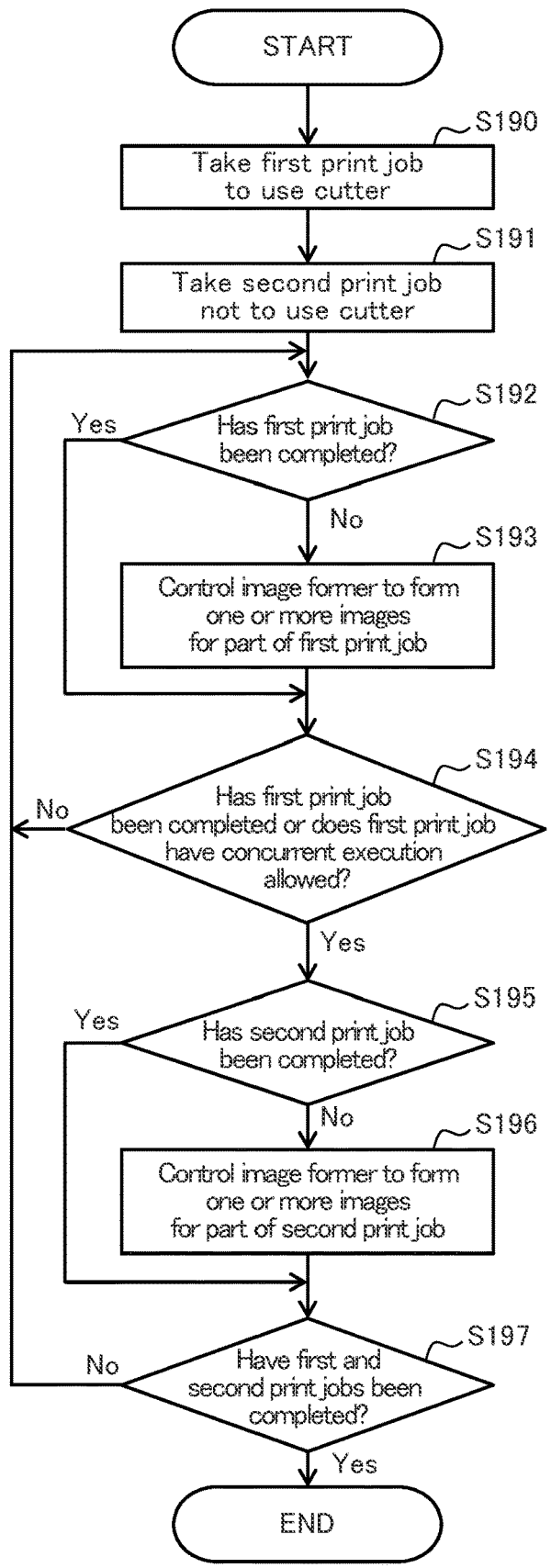
FIG. 21 is a flowchart of a case where a first print job to use a cutter is executed concurrently with a second print job not to use any cutters, with determination of a flag to allow concurrent execution.

FIG. 21 is a flowchart of a case where a first print job to use the cutter 33 is executed concurrently with a second print job not to use the cutter 33, with determination of a flag to allow concurrent execution. Here, the flag to allow concurrent processing refers to the concurrent job-execution parameter 63 in FIG. 6. The job taker 55 of the image processing device 2 takes the first print job to use the cutter 33 from the computer 1 (S190) and then takes the second print job not to use the cutter 33 from the computer 1 (S191).

The print data producer 56 of the image processing device 2 determines whether or not the first print job has been completed. When the first print job has not been completed (No), the print data producer 56 controls the image former 31 to form one or more images on one or more sheets for a part of the first print job (S193), and proceeds to step S194. When the first print job has been completed (Yes), the print data producer 56 proceeds to step S194.

In step S194, the print data producer 56 of the image processing device 2 determines whether or not the first print job has been completed or the first print job has concurrent execution allowed. The print data producer 56 proceeds to step S195 when the first print job has been completed or the first print job has concurrent execution allowed (Yes), and proceeds to step S192 when the first print job has not been completed and the first print job does not have concurrent execution allowed (No).

In step S195, the print data producer 56 of the image processing device 2 determines whether or not the second print job has been completed. When the second print job has not been completed (No), the print data producer 56 controls the image former 31 to form one or more images on one or more sheets for a part of the second print job (S196), and proceeds to step S197. When the second print job has been completed (Yes), the print data producer 56 proceeds to step S197.

In step S197, the print data producer 56 of the image processing device 2 determines whether or not the first and second print jobs have been completed. When one of the first and second print jobs has not been completed (No), the print data producer 56 returns to step S192. When both the first and second print jobs have been completed (Yes), the print data producer 56 ends the process in FIG. 21.

That is, in a case where the job taker 55 has taken the second print job not to use the cutter 33 from the computer 1 during execution of the first print job to use the cutter 33, the print data producer 56 executes the first print job concurrently with the second print job when the first print job has concurrent execution allowed, and executes the first print job and then the second print job when the first print job does not have concurrent execution allowed. In other words, the print data producer 56 does not execute the first print job concurrently with the second print job.

Figure 22:
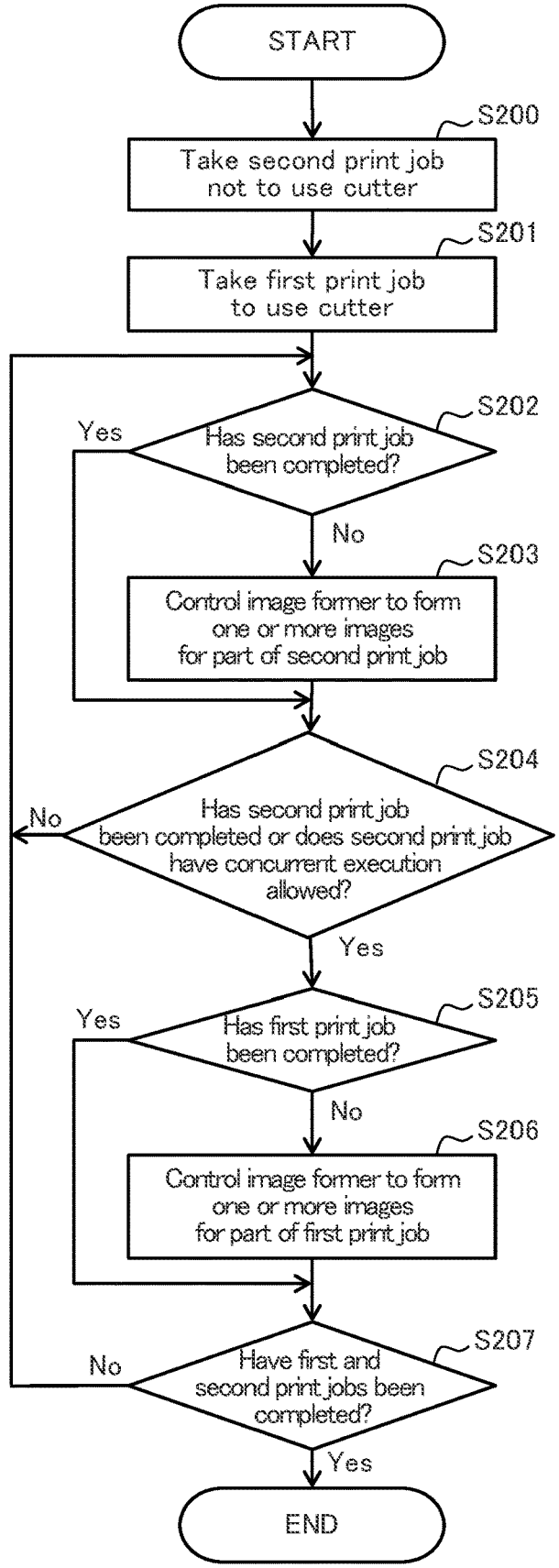
FIG. 22 is a flowchart of a case where a second print job not to use any cutters is executed concurrently with a first print job to use a cutter, with determination of a flag to allow concurrent execution.

FIG. 22 is a flowchart of a case where a second print job not to use the cutter 33 is executed concurrently with a first print job to use the cutter 33, with determination of a flag to allow concurrent execution. The job taker 55 of the image processing device 2 takes the second print job not to use the cutter 33 (S200) and then takes the first print job to use the cutter 33 from the computer 1 (S201).

The print data producer 56 of the image processing device 2 determines whether or not the second print job has been completed (S202). When the second print job has not been completed (No), the print data producer 56 controls the image former 31 to form one or more images on one or more sheets for a part of the second print job (S203), and proceeds to step S204. When the second print job has been completed (Yes), the print data producer 56 proceeds to step S204.

In step S204, the print data producer 56 of the image processing device 2 determines whether or not the second print job has been completed or the second print job has concurrent execution allowed. The print data producer 56 proceeds to step S205 when the second print job has been completed or the second print job has concurrent execution allowed (Yes), and proceeds to step S202 when the second print job has not been completed and the second print job does not have concurrent execution allowed (No).

In step S205, the print data producer 56 of the image processing device 2 determines whether or not the first print job has been completed. When the first print job has not been completed (No), the print data producer 56 controls the image former 31 to form one or more images on one or more sheets for a part of the first print job (S206), and proceeds to step S207. When the first print job has been completed (Yes), the print data producer 56 proceeds to step S207.

In step S207, the print data producer 56 of the image processing device 2 determines whether or not the first and second print jobs have been completed. When one of the first and second print jobs has not been completed (No), the print data producer 56 returns to step S202. When both the first and second print jobs have been completed (Yes), the print data producer 56 ends the process in FIG. 22.

That is, in a case where the job taker 55 has taken the first print job to use the cutter 33 from the computer 1 during execution of the second print job not to use the cutter 33, the print data producer 56 executes the second print job concurrently with the first print job when the second print job has concurrent execution allowed, and executes the second print job and then the first print job when the second print job does not have concurrent execution allowed. In other words, the print data producer 56 does not execute the second print job concurrently with the first print job.

Note that the flag to allow concurrent execution may be not only included in each print job but also specified by a user, whether or not the jobs can be concurrently executed, through a checking screen or the like, and therefore is not limited to the way described above.

Figure 23:
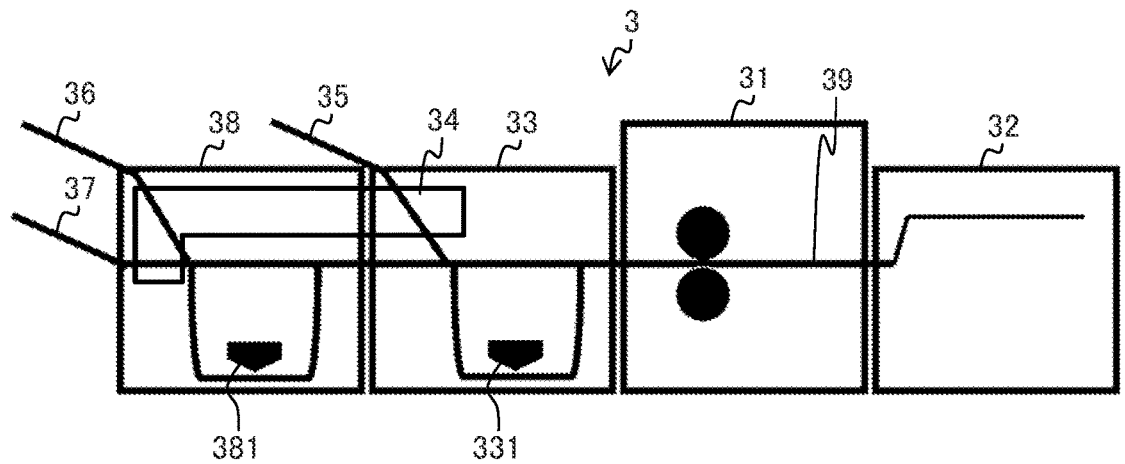
FIG. 23 shows a configuration of an image forming device including two cutters.

FIG. 23 shows a configuration of the image forming device 3 including two cutters 33, 38. The image forming device 3 includes the image former 31, the paper feeder 32, the cutters 33 and 38, the ejector 34, and the trays 35 to 37. The cutter 33 includes a cutter blade 331. The cutter 38 includes a cutter blade 381.

The sheets cut by the cutter 33 are ejected by the ejector 34 to the tray 35. The sheets cut by the cutter 38 are ejected by the ejector 34 to one of the trays 36, 37. A transfer route 39 is a route on which sheets are transferred. The reason that the transfer route 39 is branched in the middle is because the sheets may be ejected in the middle or the sheets having images formed thereon may be cut in post-processing, based on parameters.

Figure 24:
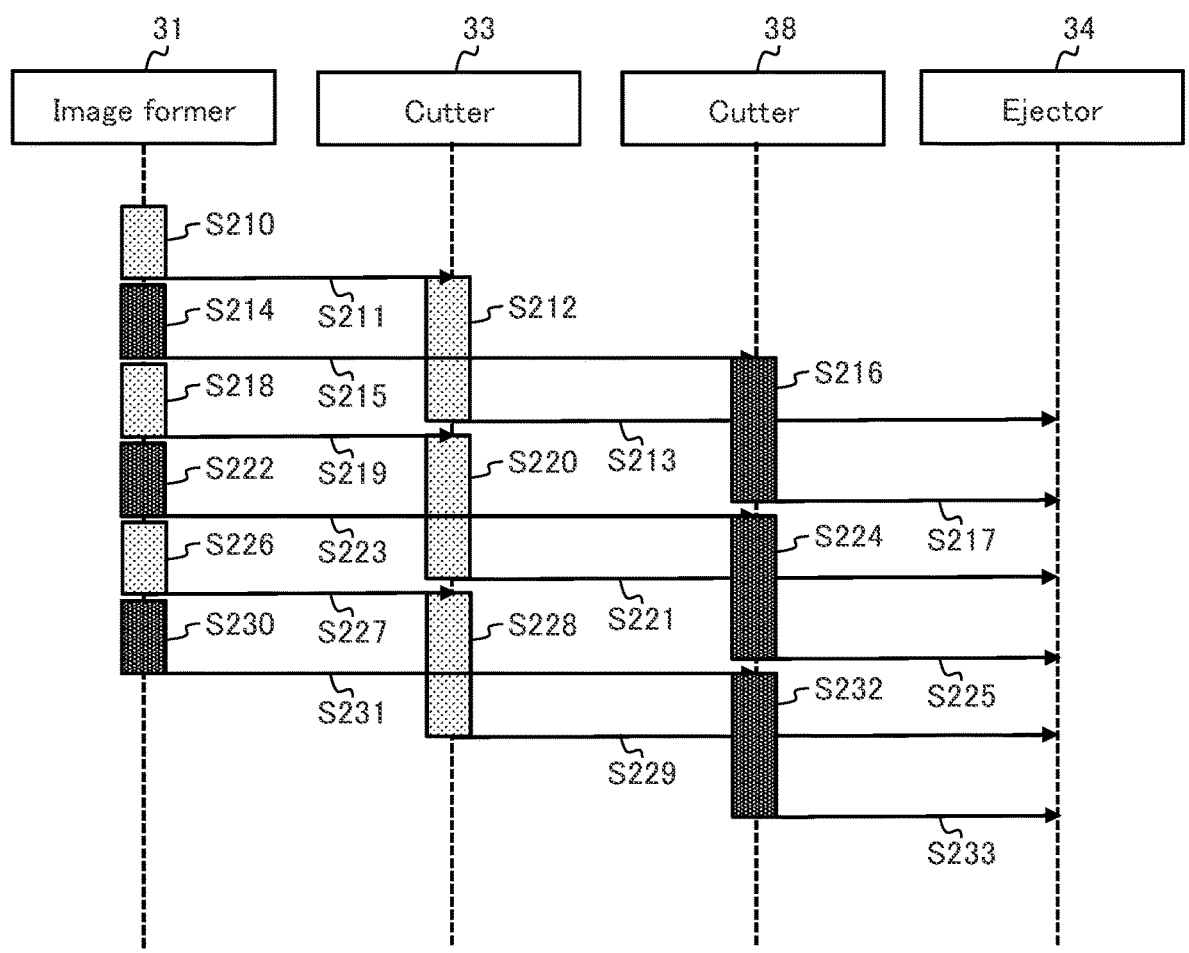
FIG. 24 is a sequence diagram of a case where a first print job to use a cutter is executed concurrently with a fourth print job to use a cutter, in the image forming device including two cutters.

FIG. 24 is a sequence diagram of a case where a first print job to use the cutter 33 is executed concurrently with a fourth print job to use the cutter 38, in the image forming device including the two cutters 33, 38. Page 1 of the first print job has an image formed by the image former 31 (S210), and is transferred to the cutter 33 (S211). Then, page 1 of the fourth print job has an image formed by the image former 31 (S214), and is transferred to the cutter 38 (S215).

Page 1 of the first print job is transferred to the cutter 33 (S211), has predetermined cutting executed by the cutter 33 (S212), and is then ejected by the ejector 34 (S213).

Page 1 of the fourth print job is transferred to the cutter 38 (S215), has predetermined cutting executed by the cutter 38 (S216), and is then ejected by the ejector 34 (S217).

Upon page 1 of the fourth print job having an image formed by the image former 31 (S214), page 2 of the first print job has an image formed by the image former 31 (S218), and is transferred to the cutter 33 (S219). Then, page 2 of the fourth print job has an image formed by the image former 31 (S222), and is transferred to the cutter 38 (S223).

Page 2 of the first print job is transferred to the cutter 33 (S219), has predetermined cutting executed by the cutter 33 (S220), and is then ejected by the ejector 34 (S221).

Page 2 of the fourth print job is transferred to the cutter 38 (S223), has predetermined cutting executed by the cutter 38 (S224), and is then ejected by the ejector 34 (S225).

Upon page 2 of the fourth print job having an image formed by the image former 31 (S222), page 3 of the first print job has an image formed by the image former 31 (S226), and is transferred to the cutter 33 (S227). Then, page 3 of the fourth print job has an image formed by the image former 31 (S230), and is transferred to the cutter 38 (S231).

Page 3 of the first print job is transferred to the cutter 33 (S227), has predetermined cutting executed by the cutter 33 (S228), and is then ejected by the ejector 34 (S229).

Page 3 of the fourth print job is transferred to the cutter 38 (S231), has predetermined cutting executed by the cutter 38 (S232), and is then ejected by the ejector 34 (S233).

That is, when the job taker 55 has taken the fourth print job to use the cutter 33 during execution of the first print job to use the cutter 33, the print data producer 56 executes the first print job concurrently with the fourth print job such that the first print job uses the cutter 33 and the fourth print job uses the cutter 38. This allows the image forming system S to reduce influence from delay by the cutter 33 as a post-processor and effectively utilize resources of the image former 31, to have higher productivity.

Figure 25:
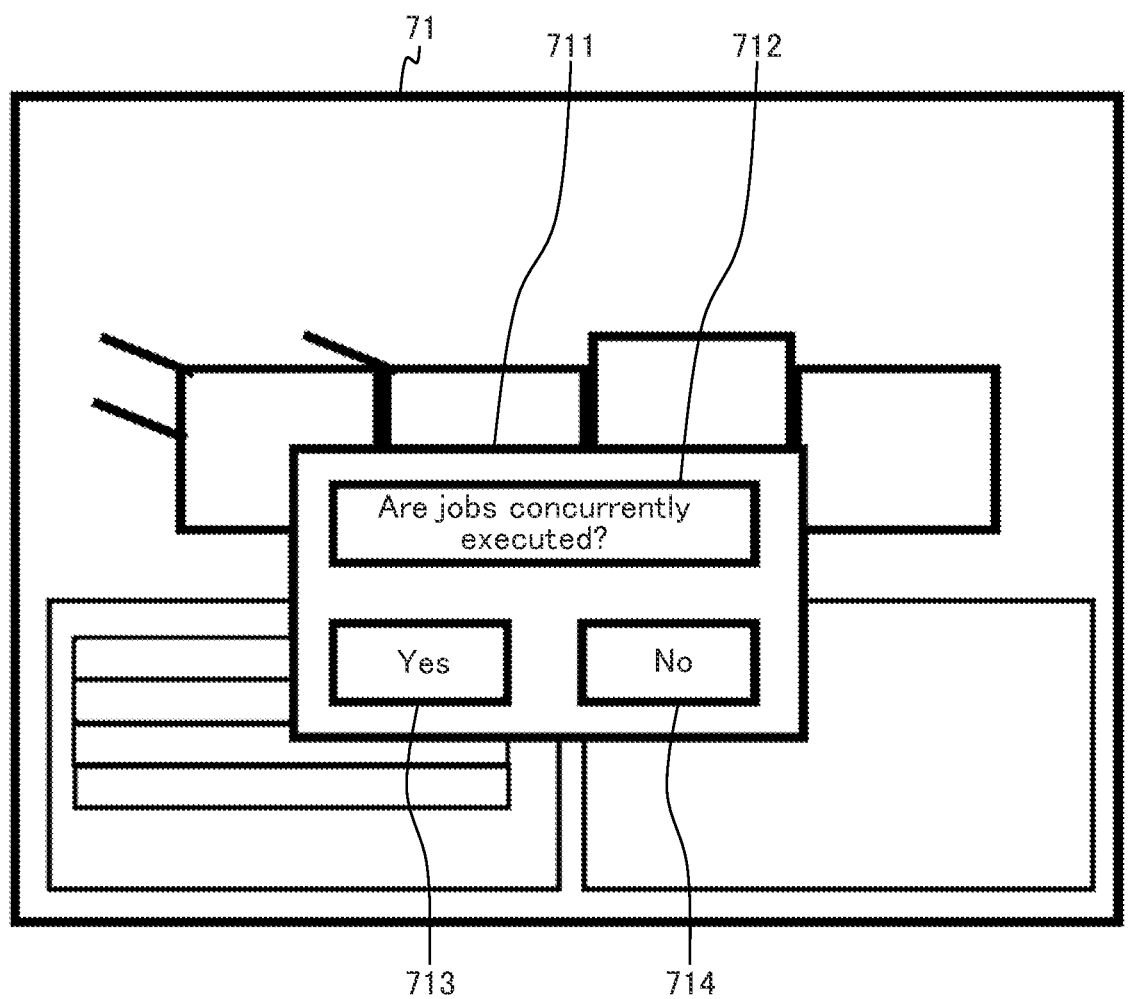
FIG. 25 shows a checking screen used for check with a user whether or not two or more print jobs are concurrently executed.

FIG. 25 shows a checking screen 71 used for checking with a user whether or not two or more print jobs are concurrently executed. The checking screen 71 is displayed on the display unit 28 in FIG. 3. When the job taker 55 has received a second print job not to use the cutter 33 during the print data producer 56 executing a first print job to use the cutter 33, the display controller 52 displays the checking screen 71 on the display unit 28 to check with a user whether or not two or more print jobs are concurrently executed.

When the job taker 55 has received a first print job to use the cutter 33 during the print data producer 56 executing a second print job not to use the cutter 33, the display controller 52 displays the checking screen 71 on the display unit 28 to check with a user whether or not two or more print jobs are concurrently executed.

The checking screen 71 has a concurrent-execution dialog 711 displayed. The concurrent-execution dialog 711 includes a text box 712 of "Are jobs concurrently executed?" with a YES-button 713 and a NO-button 714. This allows a user to check on the screen whether or not two or more print jobs are concurrently executed.

Figure 26:
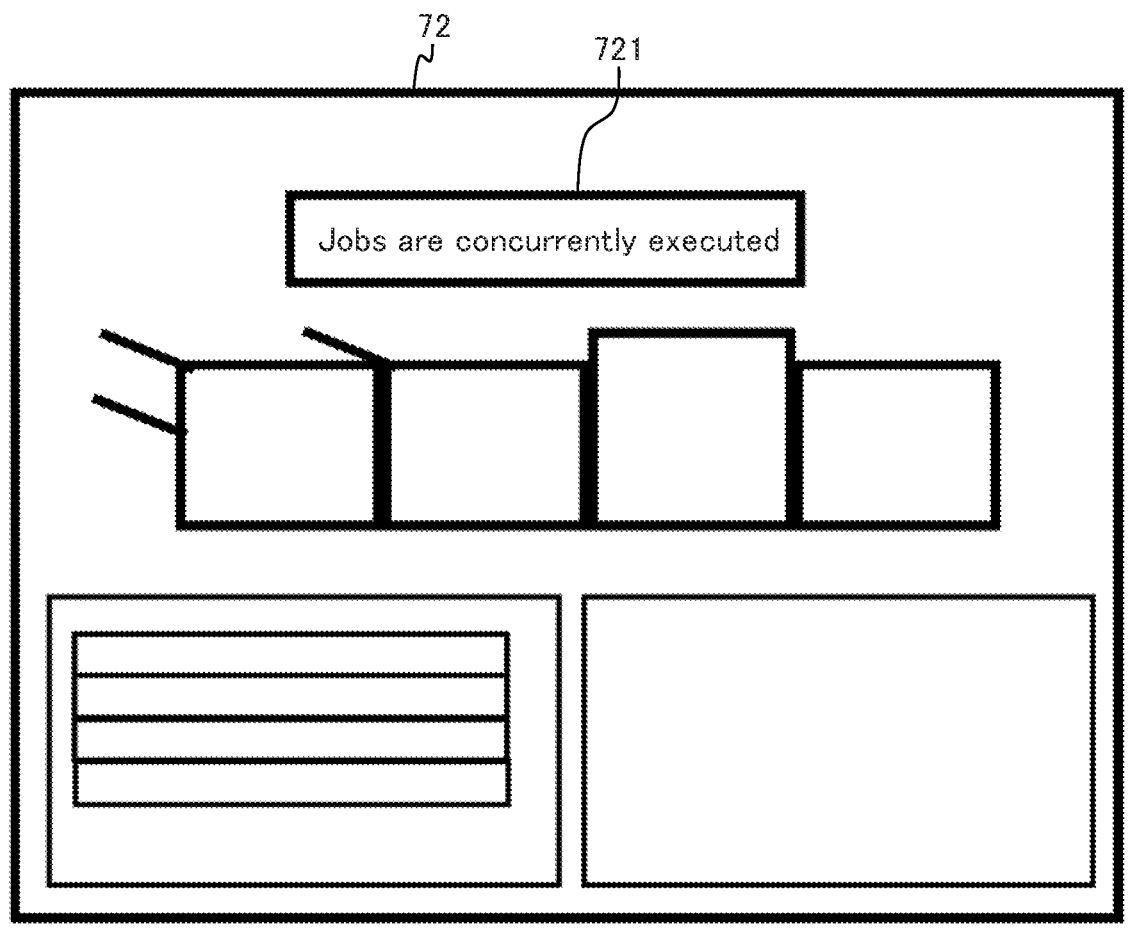
FIG. 26 shows an alarming screen used for alarming a user that two or more print jobs are concurrently executed.

FIG. 26 shows an alarming screen 72 used for alarming a user that two or more print jobs are concurrently executed. The alarming screen 72 is displayed on the display unit 28 in FIG. 3. The alarming screen 72 has a text box 721 displayed. When the print data producer 56 executes a first print job to use the cutter 33 concurrently with a second print job not to use the cutter 33, the display controller 52 alarms a user via the alarming screen 72. This allows the image forming device 3 to alarm a user that two or more print jobs are concurrently executed.

Although the embodiment of the present invention has been described and illustrated in detail, the disclosed embodiment is made for the purpose of illustration and example only and not for limitation. The scope of the present invention should be interpreted by terms of the appended claims. The present embodiment can be modified and implemented within the scope of the present invention, as described below in a) to c), for example.

a) The number of a cutter or cutters is not limited to one or two and any number of cutters may be used. b) Post-processing of image formation is not limited to cutting, and may be stapling or any other processing. c) The number of sheets each having an image formed concurrently with post-processing is not limited to one, and two or more sheets may have images formed.

LEGEND FOR REFERENCE NUMERALS

S: image forming system, 1: computer, 11: interface, 12: CPU, 13: RAM, 14: HDD, 141: printer driver, 15: NIC, 16: operation device, 17: display unit, 2: image processing device, 21: interface, 22: CPU, 23: RAM, 24: HDD, 241: program, 25: NIC, 26: data interface, 27: operation device, 28: display unit (checking unit, alarming unit), 3: image forming device, 31: image former, 32: paper feeder, 33, 38: cutter, 331, 381: cutter blade, 34: ejector, 35 to 37: trays, 39: transfer route, 4: LAN, 51: collating information receiver, 52: display controller, 53: RIP, 54: collation determiner, 55: job taker, 56: print data producer, 6: print job, 61: subject copy data, 62: cutting parameter, 63: job-execution parameter, 71: checking screen, 711: concurrent-execution dialog, 712: text box, 713: YES-button, 714: NO-button, 72: alarming screen, and 721: text box.

What is claimed is:

1. An image processing device comprising:
a hardware processor configured to:
receive a print job; and
generate and output print data to an image former which is configured to form an image on a sheet based on the print data, the print data comprising data to control a cutter configured to cut, inline, the sheet having the image formed thereon,
wherein when the hardware processor receives a first print job which uses the cutter and then receives a second print job which does not use the cutter, the hardware processor controls such that the first print job is executed concurrently with the second print job.

2. The image processing device as claimed in claim 1, wherein the hardware processor controls such that the image former forms one or more images on one or more sheets for the second print job which does not use the cutter, while the cutter is cutting one or more sheets for the first print job.

3. The image processing device as claimed in claim 1, wherein when the hardware processor receives the second print job which does not use the cutter during execution of the first print job which uses the cutter, the hardware processor controls such that the image former alternately forms one or more images for a part of the first print job and one or more images for a part of the second print job.

4. The image processing device as claimed in claim 1, wherein when the hardware processor receives the first print job during execution of the second print job, the hardware processor controls such that the second print job is executed and then the first print job is executed.

5. The image processing device as claimed in claim 1, wherein when the first print job which uses the cutter has been executed concurrently with the second print job which does not use the cutter, resulting in completion of the second print job, and the hardware processor receives a further print job which does not use the cutter, the hardware processor controls such that the first print job is executed concurrently with the further print job.

6. The image processing device as claimed in claim 1, wherein when the first print job which uses the cutter has been executed concurrently with the second print job which does not use the cutter, resulting in completion of the first print job, and the hardware processor receives a further print job to use which uses the cutter, the controls such that the second print job is executed and then the further print job is executed.

7. The image processing device as claimed in claim 1, wherein the hardware processor controls such that one or more sheets having one or more images formed for the first print job are ejected to one tray and one or more sheets having one or more images formed for the second print jobs are ejected to another tray.

8. The image processing device as claimed in claim 1, wherein when the cutter has had a failure while the first print job which uses the cutter has been executed concurrently with the second print job which does not use the cutter, the hardware processor controls to interrupt the first print job and continuously execute the second print job.

9. The image processing device as claimed in claim 1, wherein when the hardware processor receives the second print job which does not use the cutter during execution of the first print job which uses the cutter, the hardware processor controls such that (i) the first print job is executed concurrently with the second print job, in a case in which the first print job is set to allow concurrent execution, and (ii) the first print job is executed and then the second print job is executed, in a case in which the first print job is not set to allow concurrent execution.

10. The image processing device as claimed in claim 1, wherein when the hardware processor receives the first print job which uses the cutter during execution of the second print job which does not use the cutter, the hardware processor controls such that (i) the first print job is executed concurrently with the second print job, in a case in which the second print job is set to allow concurrent execution, and (ii) the second print job is executed and then the first print job is executed, in a case in which the second print job is not set to allow concurrent execution.

11. The image processing device as claimed in claim 1, wherein when the hardware processor receives a further print job which uses the cutter during execution of the first print job which uses the cutter, the hardware processor controls such that the first print job uses one cutter and the further print job uses another cutter.

12. The image processing device as claimed in claim 1, wherein the hardware processor is further configured to check with a user whether or not two or more print jobs are to be concurrently executed, when the hardware processor receives the second print job which does not use the cutter during execution of the first print job which uses the cutter.

13. The image processing device as claimed in claim 1, wherein the hardware processor is further configured to control to check with a user whether or not two or more print jobs are to be concurrently executed, when the hardware processor receives the first print job which uses the cutter during execution of the second print job which does not use the cutter.

14. The image processing device as claimed in claim 1, wherein the hardware processor is further configured to control to alarm a user when the first print job which uses the cutter is executed concurrently with the second print job which does not use the cutter.

15. An image forming device comprising:
the image processing device as claimed in claim 1;
the image former; and
the cutter.

16. A job management method comprising, in response to receiving a first print job which uses a cutter that is configured to cut a sheet inline, and then receiving a second print job which does not use the cutter, controlling an image former to form one or more images for a part of the first print job and concurrently form one or more images for a part of the second print job.

17. A non-transitory recording medium storing a computer readable program thereon which, when executed by a computer, controls the computer to perform functions comprising:
in response to receiving a first print job which uses a cutter that is configured to cut a sheet inline, and then receiving a second print job which does not use the cutter, control an image former to form one or more images for a part of the first print job which uses the cutter and concurrently form one or more images for a part of the second print job which does not use the cutter.

* * * * *